(12) United States Patent
Manolakos et al.

(10) Patent No.: US 12,494,880 B2
(45) Date of Patent: Dec. 9, 2025

(54) POSITIONING REFERENCE SIGNAL PROCESSING

(71) Applicant: QUALCOMM Incorporated, San Diego, CA (US)

(72) Inventors: Alexandros Manolakos, Escondido, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/799,447

(22) PCT Filed: Jan. 12, 2021

(86) PCT No.: PCT/US2021/013050
§ 371 (c)(1),
(2) Date: Aug. 12, 2022

(87) PCT Pub. No.: WO2021/167715
PCT Pub. Date: Aug. 26, 2021

(65) Prior Publication Data
US 2023/0104211 A1    Apr. 6, 2023

(30) Foreign Application Priority Data
Feb. 21, 2020    (GR) .............................. 20200100090

(51) Int. Cl.
*H04L 5/00*    (2006.01)
*G01S 5/00*    (2006.01)
*H04W 8/22*    (2009.01)

(52) U.S. Cl.
CPC .......... *H04L 5/0051* (2013.01); *G01S 5/0063* (2013.01); *H04W 8/22* (2013.01)

(58) Field of Classification Search
CPC ......... H04W 4/02; H04W 64/00; H04W 8/22; G01S 5/0063; G01S 5/0205; G01S 2205/007; H04L 5/0051; Y02D 30/70
See application file for complete search history.

(56) References Cited

U.S. PATENT DOCUMENTS 6,611,688 B1    8/2003    Raith
9,385,910 B2    7/2016    Lee et al.
(Continued)

FOREIGN PATENT DOCUMENTS

CN    1751503 A    3/2006
CN    102349338 A    2/2012
(Continued)

OTHER PUBLICATIONS

Lo L.-C., et al., "Wireless Multimedia Transmission Through Cooperative Spectrum Sharing With Quantized Feedback", IEEE Transactions on Broadcasting, vol. 63, Issue. 2, Jun. 2017, pp. 1-8.
(Continued)

*Primary Examiner* — Congvan Tran
(74) *Attorney, Agent, or Firm* — QUALCOMM Incorporated

(57) ABSTRACT

A user equipment includes: an interface; a memory; and a processor, communicatively coupled to the interface and the memory, configured to: receive a plurality of requests to process a corresponding plurality of positioning reference signal (PRS) groups, each of the plurality of PRS groups having respective PRS characteristics; determine a priority for processing the plurality of PRS groups according to at least one priority criterion; determine whether a total amount of the PRS characteristics of the plurality of PRS groups exceeds a PRS processing capability of the processor; select, in response to the total amount of the PRS characteristics exceeding the PRS processing capability of the processor, a subset of the plurality of PRS groups based on the priority (Continued)

for processing; and process the subset of the plurality of PRS groups to determine position information.

48 Claims, 9 Drawing Sheets

(56) References Cited

U.S. PATENT DOCUMENTS

| | | | |
|---|---|---|---|
| 9,482,742 B1 | 11/2016 | Fischer | |
| 10,080,098 B1 | 9/2018 | Edge | |
| 10,218,471 B1 | 2/2019 | Kumar et al. | |
| 10,652,852 B2* | 5/2020 | Yoon | H04L 5/0053 |
| 2002/0114315 A1 | 8/2002 | Kangas | |
| 2010/0323719 A1 | 12/2010 | Jen | |
| 2012/0062803 A1 | 3/2012 | Matsumoto et al. | |
| 2012/0149430 A1 | 6/2012 | Siomina et al. | |
| 2012/0176958 A1 | 7/2012 | Queseth et al. | |
| 2012/0302254 A1 | 11/2012 | Charbit et al. | |
| 2013/0065612 A1 | 3/2013 | Siomina et al. | |
| 2014/0313908 A1 | 10/2014 | Da Silva et al. | |
| 2014/0370914 A1 | 12/2014 | Jung et al. | |
| 2015/0237517 A1 | 8/2015 | Hwang et al. | |
| 2015/0296359 A1* | 10/2015 | Edge | G01S 1/0428 455/404.2 |
| 2016/0007222 A1 | 1/2016 | Siomina et al. | |
| 2016/0183115 A1 | 6/2016 | Seo et al. | |
| 2016/0345193 A1 | 11/2016 | Takahashi et al. | |
| 2017/0171714 A1 | 6/2017 | Cai | |
| 2017/0276761 A1 | 9/2017 | Park et al. | |
| 2017/0289831 A1 | 10/2017 | Park et al. | |
| 2017/0366244 A1 | 12/2017 | Lee et al. | |
| 2017/0374638 A1 | 12/2017 | Han et al. | |
| 2018/0049220 A1 | 2/2018 | Patil et al. | |
| 2018/0054796 A1 | 2/2018 | Edge | |
| 2018/0199306 A1 | 7/2018 | Edge et al. | |
| 2018/0206263 A1 | 7/2018 | Lin | |
| 2018/0242190 A1 | 8/2018 | Khoryaev et al. | |
| 2018/0324740 A1 | 11/2018 | Edge et al. | |
| 2019/0036579 A1 | 1/2019 | Wei et al. | |
| 2019/0037529 A1 | 1/2019 | Edge et al. | |
| 2019/0052996 A1 | 2/2019 | Sahai et al. | |
| 2019/0059101 A1 | 2/2019 | Jiang et al. | |
| 2019/0110225 A1 | 4/2019 | Edge et al. | |
| 2019/0149285 A1 | 5/2019 | Tsai et al. | |
| 2019/0165847 A1 | 5/2019 | Kim et al. | |
| 2019/0166452 A1 | 5/2019 | Tenny | |
| 2019/0199420 A1 | 6/2019 | Faxer et al. | |
| 2019/0208336 A1 | 7/2019 | Andersen et al. | |
| 2019/0215823 A1 | 7/2019 | Kim et al. | |
| 2019/0230723 A1 | 7/2019 | Kim et al. | |
| 2019/0305901 A1 | 10/2019 | Opshaug et al. | |
| 2019/0342874 A1 | 11/2019 | Davydov et al. | |
| 2019/0380054 A1 | 12/2019 | Manolakos et al. | |
| 2020/0014487 A1 | 1/2020 | Akkarakaran et al. | |
| 2020/0022167 A1 | 1/2020 | Manolakos et al. | |
| 2020/0028652 A1 | 1/2020 | Bai et al. | |
| 2020/0029262 A1 | 1/2020 | Kim et al. | |
| 2020/0041604 A1 | 2/2020 | Kim et al. | |
| 2020/0068472 A1 | 2/2020 | Kumar et al. | |
| 2020/0296749 A1 | 9/2020 | Freda et al. | |
| 2020/0344021 A1 | 10/2020 | Fang et al. | |
| 2021/0105761 A1 | 4/2021 | Cheng et al. | |
| 2021/0143959 A1 | 5/2021 | Xu et al. | |
| 2021/0219104 A1 | 7/2021 | Chen et al. | |
| 2021/0242994 A1* | 8/2021 | Bi | H04L 5/0007 |
| 2021/0250073 A1 | 8/2021 | Huang et al. | |
| 2021/0266773 A1* | 8/2021 | Lee | H04W 64/00 |
| 2021/0297850 A1 | 9/2021 | Matsumura et al. | |
| 2021/0314904 A1 | 10/2021 | Duan et al. | |
| 2021/0341562 A1* | 11/2021 | Ernstrom | G01S 5/02 |
| 2021/0367652 A1* | 11/2021 | Wernersson | H04B 7/0634 |
| 2021/0368471 A1 | 11/2021 | Manolakos et al. | |
| 2021/0400620 A1 | 12/2021 | Tao et al. | |
| 2022/0039048 A1 | 2/2022 | Khoryaev et al. | |
| 2022/0095265 A1* | 3/2022 | Cha | H04W 64/006 |
| 2022/0141797 A1 | 5/2022 | Shi et al. | |
| 2022/0155401 A1 | 5/2022 | Da et al. | |
| 2022/0159415 A1 | 5/2022 | Khoryaev et al. | |
| 2022/0163614 A1* | 5/2022 | Wong | H04W 64/00 |
| 2022/0191817 A1 | 6/2022 | Michalopoulos | |
| 2022/0225151 A1 | 7/2022 | Zhang et al. | |
| 2022/0231741 A1 | 7/2022 | Xiao et al. | |
| 2022/0256577 A1 | 8/2022 | Oh et al. | |
| 2022/0295442 A1 | 9/2022 | Goyal et al. | |
| 2022/0330198 A1 | 10/2022 | Ren | |
| 2022/0357418 A1* | 11/2022 | Wang | G01S 5/0236 |
| 2022/0361142 A1 | 11/2022 | Ko et al. | |
| 2022/0365163 A1 | 11/2022 | Baek et al. | |
| 2022/0376871 A1 | 11/2022 | Muruganathan et al. | |
| 2022/0385423 A1* | 12/2022 | Ko | G01S 5/0072 |
| 2022/0407647 A1 | 12/2022 | Baek et al. | |
| 2023/0050521 A1 | 2/2023 | Manolakos | |
| 2023/0051054 A1* | 2/2023 | Ma | H04L 5/0053 |
| 2023/0060256 A1 | 3/2023 | Wang | |
| 2023/0065668 A1 | 3/2023 | Manolakos et al. | |
| 2023/0086108 A1 | 3/2023 | Manolakos et al. | |
| 2023/0087450 A1 | 3/2023 | Yerramalli et al. | |
| 2023/0101379 A1 | 3/2023 | Manolakos et al. | |
| 2023/0101824 A1* | 3/2023 | Baek | H04W 4/40 455/522 |
| 2023/0101862 A1 | 3/2023 | Manolakos et al. | |
| 2023/0112322 A1 | 4/2023 | Duan et al. | |
| 2023/0194648 A1 | 6/2023 | Miao et al. | |
| 2023/0208490 A1 | 6/2023 | Kim et al. | |
| 2024/0107474 A1 | 3/2024 | Dwivedi et al. | |

FOREIGN PATENT DOCUMENTS

| | | |
|---|---|---|
| CN | 103125133 A | 5/2013 |
| CN | 103262604 A | 8/2013 |
| CN | 108093360 A | 5/2018 |
| CN | 108700643 A | 10/2018 |
| CN | 110100396 A | 8/2019 |
| CN | 110383875 A | 10/2019 |
| CN | 110612768 A | 12/2019 |
| CN | 110731098 A | 1/2020 |
| EP | 3439211 A1 | 2/2019 |
| EP | 3739942 A1 | 11/2020 |
| KR | 20140047394 A | 4/2014 |
| TW | 201211574 A | 3/2012 |
| TW | 201328239 A | 7/2013 |
| TW | 201808051 A | 3/2018 |
| TW | 201907740 A | 2/2019 |
| TW | 201929583 A | 7/2019 |
| TW | 201931798 A | 8/2019 |
| WO | 2010104451 A1 | 9/2010 |
| WO | 2013111996 A1 | 8/2013 |
| WO | 2016179801 A1 | 11/2016 |
| WO | 2018116303 A1 | 6/2018 |
| WO | 2018228868 A1 | 12/2018 |
| WO | 2018231812 A1 | 12/2018 |
| WO | 2019037788 A1 | 2/2019 |
| WO | 2019062581 A1 | 4/2019 |
| WO | 2019070640 | 4/2019 |
| WO | 2019137477 A1 | 7/2019 |
| WO | 2019156620 A1 | 8/2019 |
| WO | 2019162513 A1 | 8/2019 |
| WO | 2019192527 | 10/2019 |
| WO | 2019194921 | 10/2019 |
| WO | 2019199420 A1 | 10/2019 |
| WO | 2019239583 A1 | 12/2019 |
| WO | 2020003542 A1 | 1/2020 |
| WO | 2020032558 A1 | 2/2020 |
| WO | 2020033088 A1 | 2/2020 |
| WO | 2021120023 A1 | 6/2021 |

OTHER PUBLICATIONS

Tianyi F., "Evaluation and Optimization of WCDMA and LTE Network Interoperability", Chinese Master's Theses Full-text Database Information Science and Technology, No. 3, Mar. 15, 2018, pp. 1-87.

(56) References Cited

OTHER PUBLICATIONS

Wei-Qun Z., et al., "Heterogeneous Wireless Network Packet Scheduling Algorithm Based on Media Independent Handover", Control Engineering of China, vol. 24, No. 10, Oct. 31, 2017, 6 Pages.
Intel Corporation: "Feature Lead Summary #2 on AI 7.2.10.1-DL Reference Signals for NR Positioning", 3GPP TSG RAN WG1 Meeting #99, R1-1913473, Reno, US, Nov. 18-22, 2019, 27 pages, Table 1, Chapter 2.3, 2.1, 2.4, 2.6, 2.7, 2.12, 2.17, 3.1.4, 3.1.6, 3.3, 3.3.1, 3.3.8.
Taiwan Search Report—TW110101298—TIPO—Jul. 27, 2024.
Berger C., (Marvell): "Immediate and Delayed Feedback in LMR," IEEE Draft, 11-19-1319-02-00AZ-Immediate-and-Delayed-Feedback-in-LMR, IEEE-SA Mentor, Piscataway, NJ USA, vol. 802.11az, No. 2, Jul. 18, 2019 (Jul. 18, 2019), 5 pages, XP068153284, Retrieved from the Internet : URL: https://mentor.ieee.org/802.11/dcn/19/11-19-1319-02-00az-immediate-and-delayed-feedback-in-lmr.docx [retrieved on Jul. 18, 2019] the whole document.
Catt: "Further Discussion of NR RAT-Dependent DL Positioning," 3GPP Draft, 3GPP TSG RAN WG1 Meeting#96, R1-1901980, Athens, Greece, Feb. 25-Mar. 1, 2019, 3rd Generation Partnership Project (3GPP), Mobile Competence Centre; 650, Route Des Lucioles; F-06921, Sophia-Antipolis Cedex; France, Mar. 1, 2019 (Mar. 1, 2019), XP051599674, pp. 1-30, p. 18, paragraph 2.8—p. 19.
Catt: "NR Positioning with DL/UL Measurements", 3GPP TSG RAN WG1 Ad-Hoc Meeting 1901, R1-1900312_NR Rat-Dependent DL UL Positioning, 3rd Generation Partnership Project, Mobile Competence Centre; 650, Route Des Lucioles; F-06921, Sophia-Antipolis Cedex; France, vol. RAN WG1, No. Taipei, Jan. 21, 2019-Jan. 25, 2019, Jan. 20, 2019, XP051593226, 5 pages.
Ericsson: "Lower-Layer Mobility Enhancements", 3GPP Draft, 3GPP TSG-RAN WG1 Meeting #99, Tdoc R1-1912060, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-11, Nov. 8, 2019 (Nov. 8, 2019), XP051819934, Abstract p. 3, Observation 3, Sections 2, 2.1, 2.2, pp. 1-10.
Intel Corporation: "Location based SL Resource Allocation", 3GPP TSG Ran WG2 Meeting #93bis, 3GPP Draft; R2-162456, 3rd Generation Partnership Project (3GPP), Mobile Competence Centre; 650, Route Des Lucioles; F-06921 Sophia-Antipolis Cedex; France, vol. RAn WG2, No. Dubrovnik, Croatia; Apr. 11, 2016-Apr. 15, 2016, 3 Pages, Apr. 2, 2016 (Apr. 2, 2016), XP051082413, the whole document.
International Search Report and Written Opinion—PCT/US2021/013050—ISA/EPO—Apr. 23, 2021.
Mitsubishi Electric: "Views on DL Reference Signal Designs for NR Positioning", 3GPP TSG RAN WG1 Meeting #99, 3GPP Draft; R1-1912836, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, 10 Pages, Nov. 8, 2019 (Nov. 8, 2019), XP051820208, section 2.1.
Nokia, et al., "Remaining Details for CSI Reporting on PUCCH", 3GPP Draft, 3GPP TSG RAN WG1 Meeting AH 1801, R1-1800744 CSI Reporting on Pucch, 3rd Generation Partnership Project (3GPP), Mobile Competence Centre, 650, Route Des Lucioles, F-06921 Sophia-Antipolis Cedex, France, vol. RAN WG1. No. Vancouver. Canada, Jan. 22, 2018-Jan. 26, 2018 Jan. 12, 2018 (Jan. 12, 2018), XP051384482, 5 Pages, Sections 2, 2.3, 2.4, Paragraph [02.4].
Spreadtrum Communications: "Discussion on Multi-TRP Transmission", 3GPP TSG RAN WG1 Meeting #AH1901, R1-1900711, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019, XP051593558, 6 pages.
Mitsubishi Electric: "Views on DL Reference Signal Designs for NR Positioning", 3GPP TSG RAN WG1 Meeting #99, R1-1912836, Reno, USA, Nov. 18, 2019-Nov. 22, 2019, Nov. 30, 2019, 9 Pages, Section 2.1.
Ericsson: "UE and gNB Measurements for NR Positioning", R1-1913137, 3GPP TSG RAN WG1 #99 Reno, NV, USA, Oct. 18-22, 2019, pp. 1-25.
Ericsson: "UE Measurements for Otdoa", 3GPP TSG-RAN WG4 Meeting #93, R4-1915258, Reno, Nevada, USA, Nov. 18-22, 2019, pp. 1-7, Nov. 8, 2019.
Huawei, et al., "Discussion on PRS-RSRP Measurement", R4-2001638, 3GPP TSG-RAN WG4 Meeting #94-e Online, Feb. 24-Mar. 6, 2020, pp. 1-4.
Huawei, et al., "Discussion on RSTD Measurement", 3GPP TSG-RAN WG4 Meeting #94-e, R4-2001637, Online, Feb. 24, 2020-Mar. 6, 2020, Feb. 14, 2020, pp. 1-7.
Huawei, et al., "Sidelink Csi", 3GPP TSG RAN WG1 Meeting #98, R1-1909438, Prague, Czech Republic, Aug. 28, 2019-Aug. 30, 2019, Aug. 17, 2019, 9 pages.
Huawei, et al., "Impact of PRS Measurement on Existing RRM Requirements", 3GPP TSG-RAN WG4 Meeting #94-e, R4-2001640, Online, Feb. 24, 2020-Mar. 6, 2020, Feb. 14, 2020, pp. 1-3.
Huawei, et al., "Maintenance of DL PRS for NR Positioning", 3GPP TSG RAN WG1 Meeting #100-e, R1-2000190, Feb. 24, 2020-Mar. 6, 2020, Feb. 15, 2020, 15 Pages.
Huawei, et al., "Periodic CQI/PMI/RI Reporting for CA", 3GPP TSG RAN WG1 meeting #62bis, R1-105122, Xi'an, China, Oct. 11-15, 2010, 5 Pages, Oct. 5, 2010.
Intel Corporation: "Remaining Details of Physical Layer Measurements for NR Positioning", 3GPP TSG RAN WG1 Meeting #98bis, R1-1910676, Chongqing, China, Oct. 14, 2019-Oct. 20, 2019, Oct. 5, 2019, pp. 1-21.
LG Electronics: "Discussions on UE and gNB Measurements for NR Positioning", R1-1912274, 3GPP TSG Ran WG1 #99 Reno, USA, Nov. 18-22, 2019, 16 Pages.
Nokia, et al., "Remaining Issue on Type II CSI Omission", R1-1807187, 3GPP TSG RAN WG1 Meeting #93 Busan, Korea, May 21-25, 2018, 3 pages.
IP.com: "Summaries with Thumbnails", IP.com Search History, InnovationQ+, Dec. 24, 2024, pp. 1-127.
Proquest: "Search Strategy from Dialog", ProQuest Search History, Dec. 24, 2024, 5 Pages.
IP.com: "Summaries with Thumbnails", InnovationQ+, IP.com Search History, May 25, 2017-Apr. 17, 2025, pp. 1-127, Apr. 17, 2025.

* cited by examiner

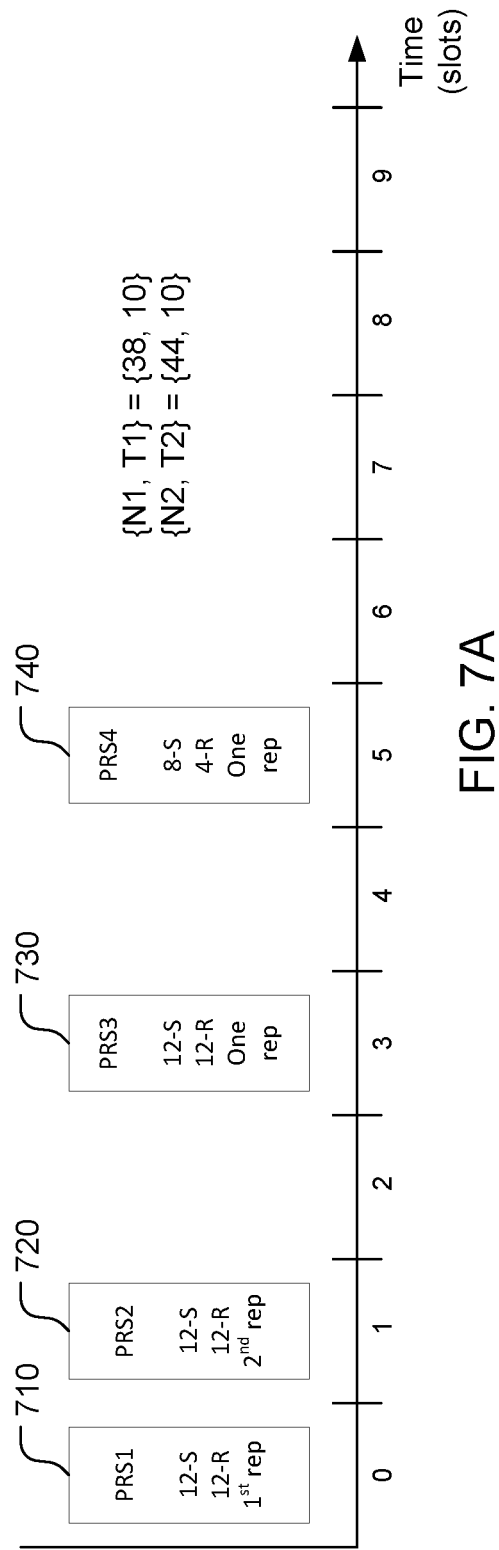
FIG. 7A
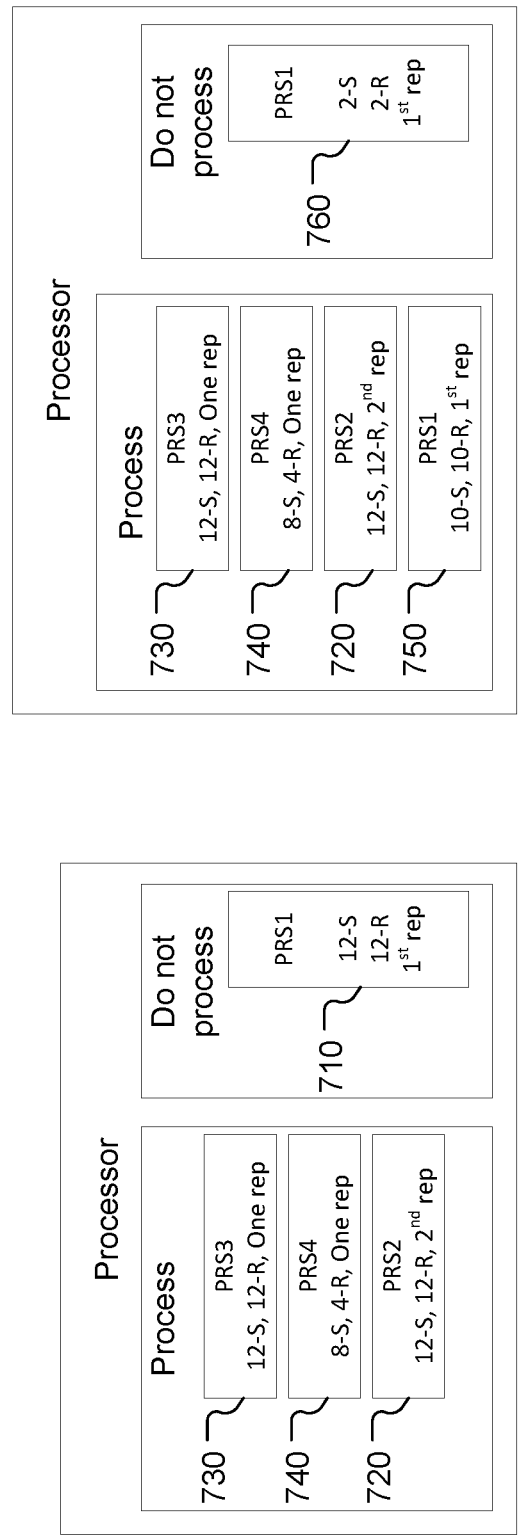
FIG. 7B
FIG. 7C

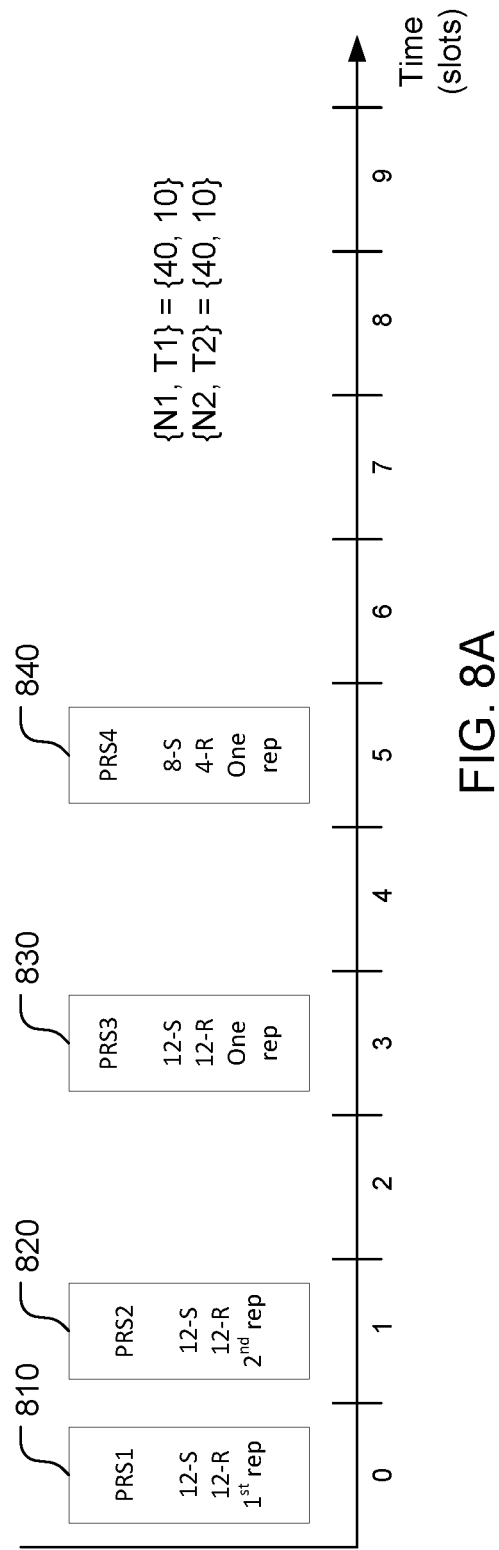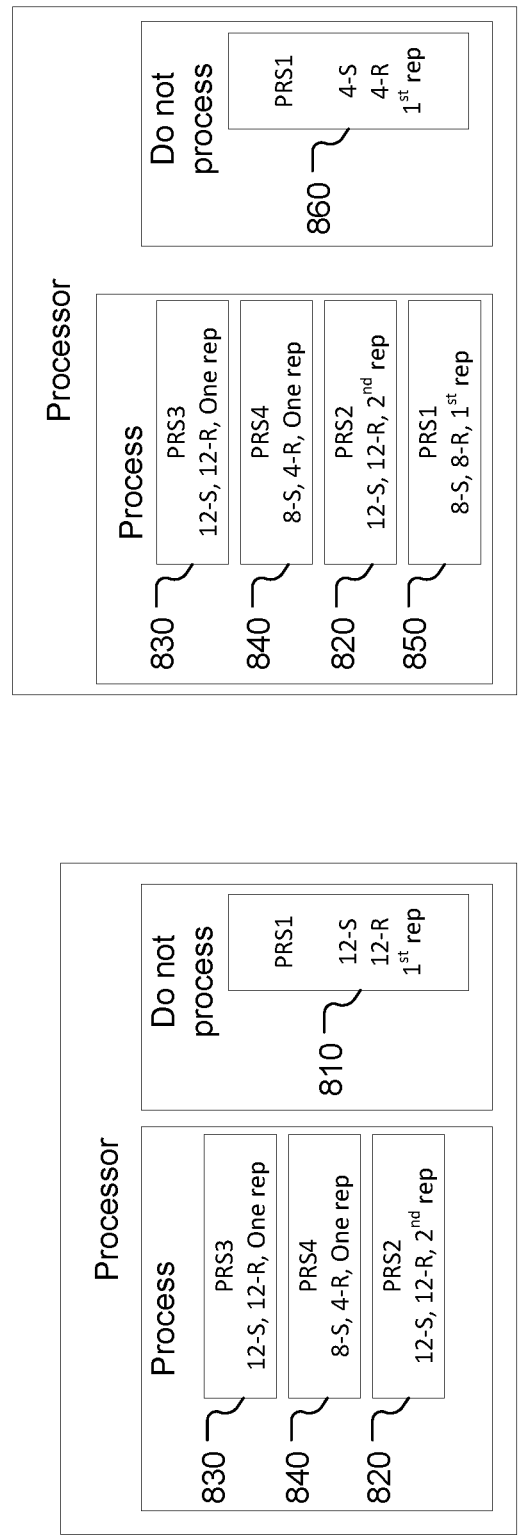
FIG. 8A
FIG. 8B
FIG. 8C

POSITIONING REFERENCE SIGNAL PROCESSING

CROSS-REFERENCE TO RELATED APPLICATIONS

This application is the National Stage of International Application No. PCT/US2021/013050, filed Jan. 12, 2021, entitled "POSITIONING REFERENCE SIGNAL PROCESSING," which claims the benefit of Greek patent application No. 20200100090, filed Feb. 21, 2020, entitled "POSITIONING REFERENCE SIGNAL PROCESSING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment (UE) includes: an interface; a memory; and a processor, communicatively coupled to the interface and the memory, configured to: receive a plurality of requests to process a corresponding plurality of positioning reference signal (PRS) groups, each of the plurality of PRS groups having respective PRS characteristics; determine a priority for processing the plurality of PRS groups according to at least one priority criterion; determine whether a total amount of the PRS characteristics of the plurality of PRS groups exceeds a PRS processing capability of the processor; select, in response to the total amount of the PRS characteristics exceeding the PRS processing capability of the processor, a subset of the plurality of PRS groups based on the priority for processing; and process the subset of the plurality of PRS groups to determine position information.

Implementations of such a UE may include one or more of the following features. The processor is configured to select the subset of the plurality of PRS groups such that the subset of the plurality of PRS groups is within the PRS processing capability of the processor. Each of the plurality of PRS groups includes a plurality of PRS symbols, or a plurality of PRS resources, or a plurality of PRS resource sets, or a plurality of frequency layers. To select the subset of the plurality of PRS groups the processor is configured to select a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the processor, and to exclude any portion of any of the plurality of PRS groups having a lower priority than a lowest-priority PRS group of the first subset of the plurality of PRS groups. To select the subset of the plurality of PRS groups the processor is configured to select a second subset of the plurality of PRS groups that includes a maximum number of highest-priority PRS groups of the plurality of PRS groups, based on the priority for processing, with a second subset total quantity of the PRS characteristics of the first subset of the plurality of PRS groups being equal to or less than the PRS processing capability of the processor, and to select a portion of a next-highest priority PRS group, relative to the second subset, of the plurality of PRS groups that is equal to a difference between the second subset total quantity of the PRS characteristics and the PRS processing capability of the processor. Each of the plurality of PRS groups includes a plurality of PRS symbols, and wherein the processor is configured to select as the portion of the next-highest priority PRS group of the plurality of PRS groups a quantity of symbols, of the next-highest priority PRS group of the plurality of PRS groups, that is equal to a difference between a total quantity of PRS symbols of the second subset of the plurality of PRS groups and a PRS symbol processing capability of the processor. Each the plurality of PRS groups includes a plurality of PRS resources, and wherein the processor is configured to select as the portion of the next-highest priority PRS group of the plurality of PRS groups a quantity of PRS resources, of the next-highest priority PRS group of the plurality of PRS groups, that is equal to a difference between a total quantity of PRS resources of the second subset of the plurality of PRS groups and a PRS resource processing capability of the processor.

Also or alternatively, implementations of such a UE may include one or more of the following features. The UE includes a transmitter communicatively coupled to the processor, wherein the processor is configured to send, via the transmitter, an indication of the PRS processing capability of the processor to a network entity. The processor is configured to send, as the indication of the PRS processing capability of the processor, a quantity of PRS resources, or a quantity of PRS symbols, or a quantity of PRS resource sets, or a quantity of frequency layers. The processor is configured to send, as the indication of the PRS processing capability of the processor: at least one first tuple comprising the quantity of PRS resources and a first time window; or at least one second tuple comprising the quantity of PRS symbols and a second time window; or a combination of these. The processor is configured to determine the indication of the PRS processing capability of the processor based on non-PRS processing capability of the processor for processing information other than PRS. The at least one priority criterion includes whether the position information is a location of the UE or a positioning signal measurement, or a time of arrival of each of at least two of the plurality of PRS groups, or whether each of the plurality of requests was a scheduled request.

Another example UE includes: means for receiving a plurality of requests to process a corresponding plurality of positioning reference signal (PRS) groups, each of the plurality of PRS groups having respective PRS characteristics; means for determining a priority for processing of the plurality of PRS groups according to at least one priority criterion; means for determining whether a total amount of the PRS characteristics of the plurality of PRS groups exceeds a PRS processing capability of the UE; selecting means for selecting, in response to the total amount of the PRS characteristics exceeding the PRS processing capability of the UE, a subset of the plurality of PRS groups based on the priority for processing; and means for processing the subset of the plurality of PRS groups to determine position information.

Implementations of such a UE may include one or more of the following features. The selecting means include means for selecting the subset of the plurality of PRS groups such that the subset of the plurality of PRS groups is within the PRS processing capability of the UE. Each of the plurality of PRS groups includes a plurality of PRS symbols, or a plurality of PRS resources, or a plurality of PRS resource sets, or a plurality of frequency layers. To select the subset of the plurality of PRS groups the selecting means comprise means for selecting a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the UE, and to exclude any portion of any of the plurality of PRS groups having a lower priority than a lowest-priority PRS group of the first subset of the plurality of PRS groups. To select the subset of the plurality of PRS groups the selecting means comprise means for selecting a second subset of the plurality of PRS groups that includes a maximum number of highest-priority PRS groups of the plurality of PRS groups, based on the priority for processing, with a second subset total quantity of the PRS characteristics of the first subset of the plurality of PRS groups being equal to or less than the PRS processing capability of the UE, and for selecting a portion of a next-highest priority PRS group, relative to the second subset, of the plurality of PRS groups that is equal to a difference between the second subset total quantity of the PRS characteristics and the PRS processing capability of the UE. Each of the plurality of PRS groups includes a plurality of PRS symbols, and wherein to select as the portion of the next-highest priority PRS group of the plurality of PRS groups the selecting means comprise means for selecting a quantity of symbols, of the next-highest priority PRS group of the plurality of PRS groups, that is equal to a difference between a total quantity of PRS symbols of the second subset of the plurality of PRS groups and a PRS symbol processing capability of the UE. Each of the plurality of PRS groups includes a plurality of PRS resources, and wherein to select as the portion of the next-highest priority PRS group of the plurality of PRS groups the selecting means comprise means for selecting a quantity of PRS resources, of the next-highest priority PRS group of the plurality of PRS groups, that is equal to a difference between a total quantity of PRS resources of the second subset of the plurality of PRS groups and a PRS resource processing capability of the UE.

Also or alternatively, implementations of such a UE may include one or more of the following features. The UE includes sending means for sending an indication of the PRS processing capability of the UE to a network entity. The sending means comprise means for sending, as the indication of the PRS processing capability of the UE, a quantity of PRS resources, or a quantity of PRS symbols, or a quantity of PRS resource sets, or a quantity of frequency layers. The sending means comprise means for sending, as the indication of the PRS processing capability of the processor: at least one first tuple comprising the quantity of PRS resources and a first time window; or at least one second tuple comprising the quantity of PRS symbols and a second time window; or a combination of these. The UE includes means for determining the indication of the PRS processing capability of the UE based on non-PRS processing capability of the UE for processing information other than PRS. The at least one priority criterion includes whether the position information is a location of the UE or a positioning signal measurement, or a time of arrival of each of at least two of the plurality of PRS groups, or whether each of the plurality of requests was a scheduled request.

An example method of processing positioning reference signals includes: receiving, at a user equipment (UE), a plurality of requests to process a corresponding plurality of positioning reference signal (PRS) groups, each of the plurality of PRS groups having respective PRS characteristics; determining a priority for processing of the plurality of PRS groups according to at least one priority criterion; determining whether a total amount of the PRS characteristics of the plurality of PRS groups exceeds a PRS processing capability of the UE; selecting, in response to the total amount of the PRS characteristics of the plurality of PRS groups exceeding the PRS processing capability of the UE, a subset of the plurality of PRS groups based on the priority for processing; and processing the subset of the plurality of PRS groups to determine position information.

Implementations of such a method may include one or more of the following features. The subset of the plurality of PRS groups is selected such that the subset of the plurality of PRS groups is within the PRS processing capability of the UE. Each of the plurality of PRS groups includes a plurality of PRS symbols, or a plurality of PRS resources, or a plurality of PRS resource sets, or a plurality of frequency layers. Selecting the subset of the plurality of PRS groups includes selecting a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the UE, and excluding any portion of any of the plurality of PRS groups having a lower priority than a lowest-priority PRS group of the first subset of the plurality of PRS groups. Selecting the subset of the plurality of PRS groups includes selecting a second subset of the plurality of PRS groups that includes a maximum number of highest-priority PRS groups of the plurality of PRS groups, based on the priority for processing, with a second subset total quantity of the PRS characteristics of the second subset of the plurality of PRS groups being equal to or less than the PRS processing capability of the UE, and selecting a portion of a next-highest priority PRS group, relative to the second subset, of the plurality of PRS groups that is equal to a difference between the second subset total quantity of the PRS characteristics and the PRS processing capability of the UE. Each of the plurality of PRS groups includes a plurality of PRS symbols, and wherein selecting the portion of the next-highest priority PRS group of the plurality of PRS groups includes selecting a quantity of symbols, of the next-highest priority PRS group of the plurality of PRS groups, that is equal to a difference between a total quantity of PRS symbols of the second subset of the plurality of PRS groups and a PRS symbol processing capability of the UE. Each of the plurality of PRS groups includes a plurality of PRS resources, and wherein selecting the portion of the next-highest priority PRS group of the plurality of PRS groups includes selecting a quantity of PRS resources, of the next-highest priority PRS group of the plurality of PRS groups, that is equal to a difference between a total quantity of PRS resources of the second subset of the plurality of PRS groups and a PRS resource processing capability of the UE.

Also or alternatively, implementations of such a method may include one or more of the following features. The method includes sending an indication of the PRS processing capability of the UE to a network entity. The indication of the PRS processing capability of the UE includes a quantity of PRS resources, or a quantity of PRS symbols, or a quantity of PRS resource sets, or a quantity of frequency layers. The indication of the PRS processing capability of the UE includes: at least one first tuple comprising the quantity of PRS resources and a first time window; or at least one second tuple comprising the quantity of PRS symbols and a second time window; or a combination of these. The method includes determining the indication of the PRS processing capability of the UE based on non-PRS processing capability of the UE for processing information other than PRS. The at least one priority criterion includes whether the position information is a location of the UE or a positioning signal measurement, or a time of arrival of each of at least two of the plurality of PRS groups, or whether each of the plurality of requests was a scheduled request.

An example non-transitory, processor-readable storage medium includes processor-readable instructions configured to cause a processor to: receive a plurality of requests to process a corresponding plurality of positioning reference signal (PRS) groups, each of the plurality of PRS groups having respective PRS characteristics; determine a priority for processing of the plurality of PRS groups according to at least one priority criterion; determine whether a total amount of the PRS characteristics of the plurality of PRS groups exceeds a PRS processing capability of the processor; select, in response to the total amount of the PRS characteristics exceeding the PRS processing capability of the processor, a subset of the plurality of PRS groups based on the priority for processing such that the subset of the plurality of PRS groups is within the PRS processing capability of the processor; and process the subset of the plurality of PRS groups to determine position information.

Implementations of such a storage medium may include one or more of the following features. The instructions configured to cause the processor to select the subset of the plurality of PRS groups are configured to cause the processor to select the subset of the plurality of PRS groups such that the subset of the plurality of PRS groups is within the PRS processing capability of the processor. Each of the plurality of PRS groups includes a plurality of PRS symbols, or a plurality of PRS resources, or a plurality of PRS resource sets, or a plurality of frequency layers. To select the subset of the plurality of PRS groups the instructions are configured to cause the processor to select a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the processor, and to exclude any portion of any of the plurality of PRS groups having a lower priority than a lowest-priority PRS group of the first subset of the plurality of PRS groups. To select the subset of the plurality of PRS groups the instructions are configured to cause the processor to select a second subset of the plurality of PRS groups that includes a maximum number of highest-priority PRS groups of the plurality of PRS groups, based on the priority for processing, with a second subset total quantity of the PRS characteristics of the first subset of the plurality of PRS groups being equal to or less than the PRS processing capability of the processor, and to select a portion of a next-highest priority PRS group, relative to the second subset, of the plurality of PRS groups that is equal to a difference between the second subset total quantity of the PRS characteristics and the PRS processing capability of the processor. Each of the plurality of PRS groups includes a plurality of PRS symbols, and wherein to select the portion of the next-highest priority PRS group of the plurality of PRS groups the instructions are configured to cause the processor to select a quantity of symbols, of the next-highest priority PRS group of the plurality of PRS groups, that is equal to a difference between a total quantity of PRS symbols of the second subset of the plurality of PRS groups and a PRS symbol processing capability of the processor. Each of the plurality of PRS groups includes a plurality of PRS resources, and wherein to select the portion of the next-highest priority PRS group of the plurality of PRS groups the instructions are configured to cause the processor to select a quantity of PRS resources, of the next-highest priority PRS group of the plurality of PRS groups, that is equal to a difference between a total quantity of PRS resources of the second subset of the plurality of PRS groups and a PRS resource processing capability of the processor.

Also or alternatively, implementations of such a storage medium may include one or more of the following features. The instructions are configured to cause the processor to send an indication of the PRS processing capability of the processor to a network entity. The indication of the PRS processing capability of the processor includes a quantity of PRS resources, or a quantity of PRS symbols, or a quantity of PRS resource sets, or a quantity of frequency layers. The indication of the PRS processing capability of the processor includes: at least one first tuple comprising the quantity of PRS resources and a first time window; or at least one second tuple comprising the quantity of PRS symbols and a second time window; or a combination of these. The instructions are configured to cause the processor to determine the indication of the PRS processing capability of the processor based on non-PRS processing capability of the processor for processing information other than PRS. The at least one priority criterion includes whether the position information is a location of the processor or a positioning signal measurement, or a time of arrival of each of at least two of the plurality of PRS groups, or whether each of the plurality of requests was a scheduled request.

BRIEF DESCRIPTION OF THE DRAWINGS

FIG. 7A is a simplified timing diagram of receipt of positioning signal groups.

FIG. 7B is a simplified diagram of selective processing of the positioning signal groups shown in FIG. 7A where whole groups are processed.

FIG. 7C is a simplified diagram of selective processing of the positioning signal groups shown in FIG. 7A where a partial group is processed.

FIG. 8A is a simplified timing diagram of receipt of positioning signal groups.

FIG. 8B is a simplified diagram of selective processing of the positioning signal groups shown in FIG. 8A where whole groups are processed.

FIG. 8C is a simplified diagram of selective processing of the positioning signal groups shown in FIG. 8A where a partial group is processed.

DETAILED DESCRIPTION

Figure 1:
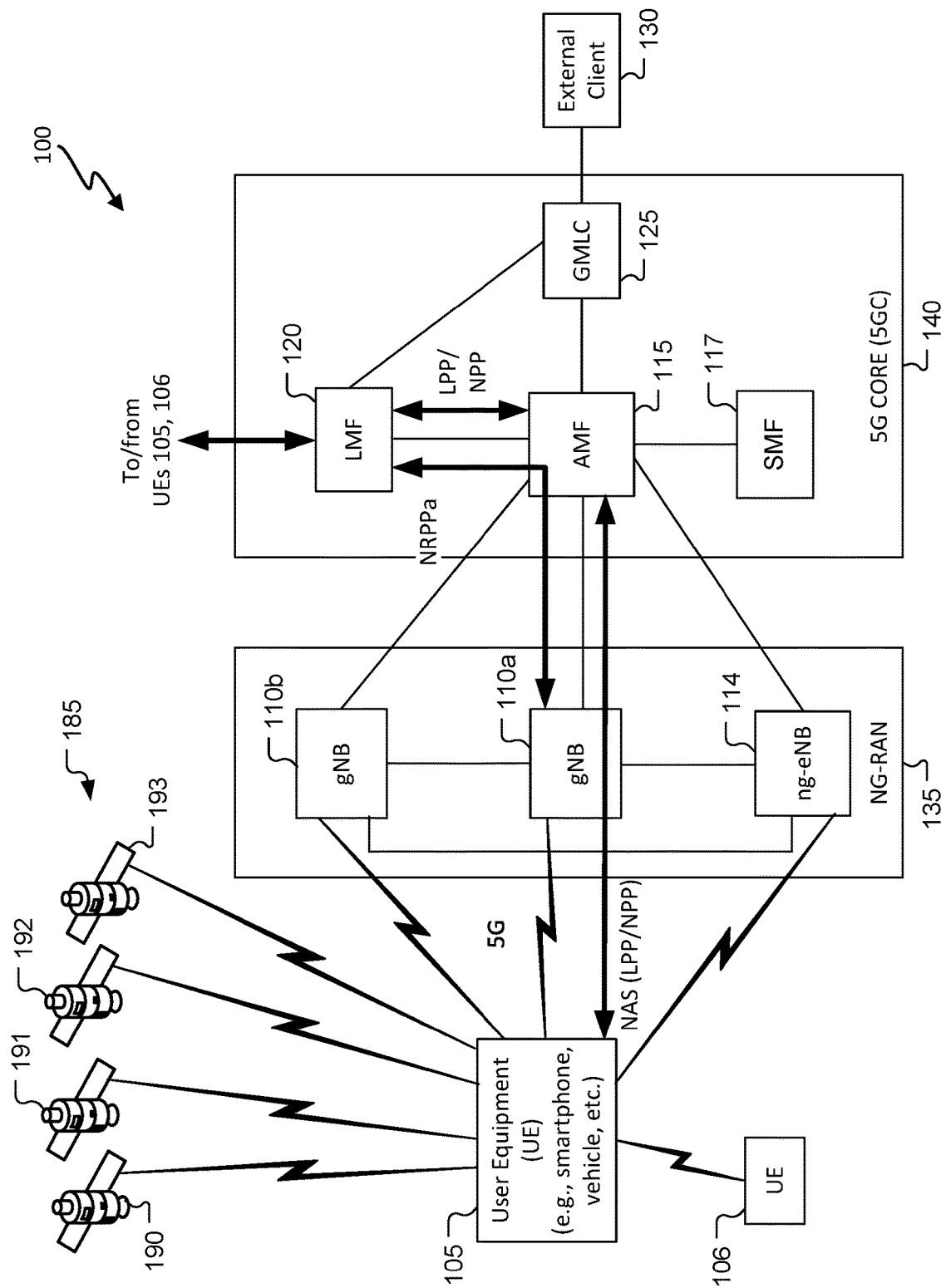
FIG. 1 is a simplified diagram of an example wireless communications system.

Techniques are discussed herein for selectively processing positioning reference signals. Positioning reference signals may be prioritized for processing, e.g., by a user equipment (UE), and if a combination of the positioning reference signals requested to be processed exceed a processing capability (e.g., processing capacity), then a subset of the positioning reference signals is selected, based on the relative priorities of the positioning reference signals, for processing. The subset may exclude a group of positioning signals if the entire group cannot fit within the processing capability in view of higher-priority groups in the subset. Alternatively, a portion of a group may be processed even if the entire group cannot fit within the processing capability in combination with higher-priority groups. Techniques discussed herein may be particularly useful for downlink positioning techniques and/or downlink-plus-uplink positioning techniques. These are examples, and other examples may be implemented.

Items and/or techniques described herein may provide one or more of the following capabilities, as well as other capabilities not mentioned. Latency of processing positioning reference signals may be reduced. Positioning reference signals of higher importance may be identified and processed with higher priority than lower-importance positioning reference signals. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b.

Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
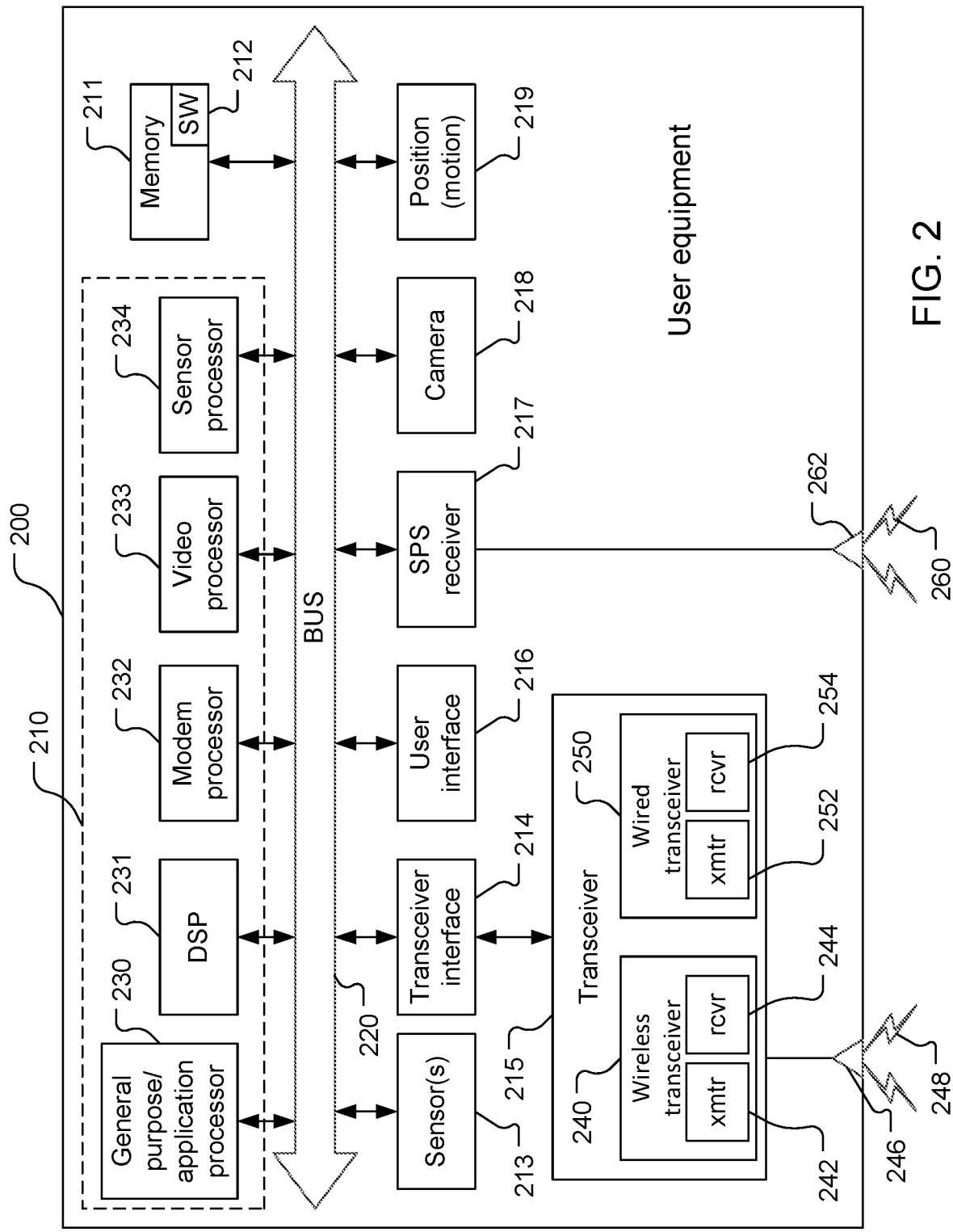
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
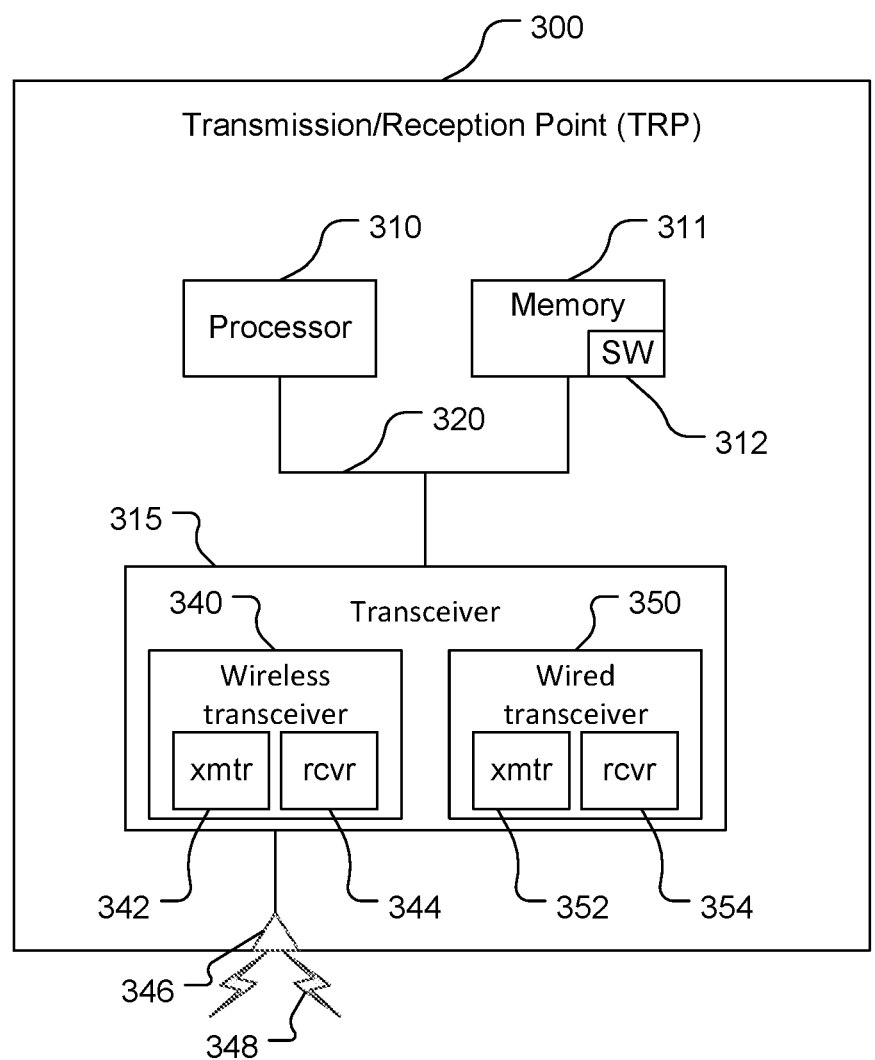
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
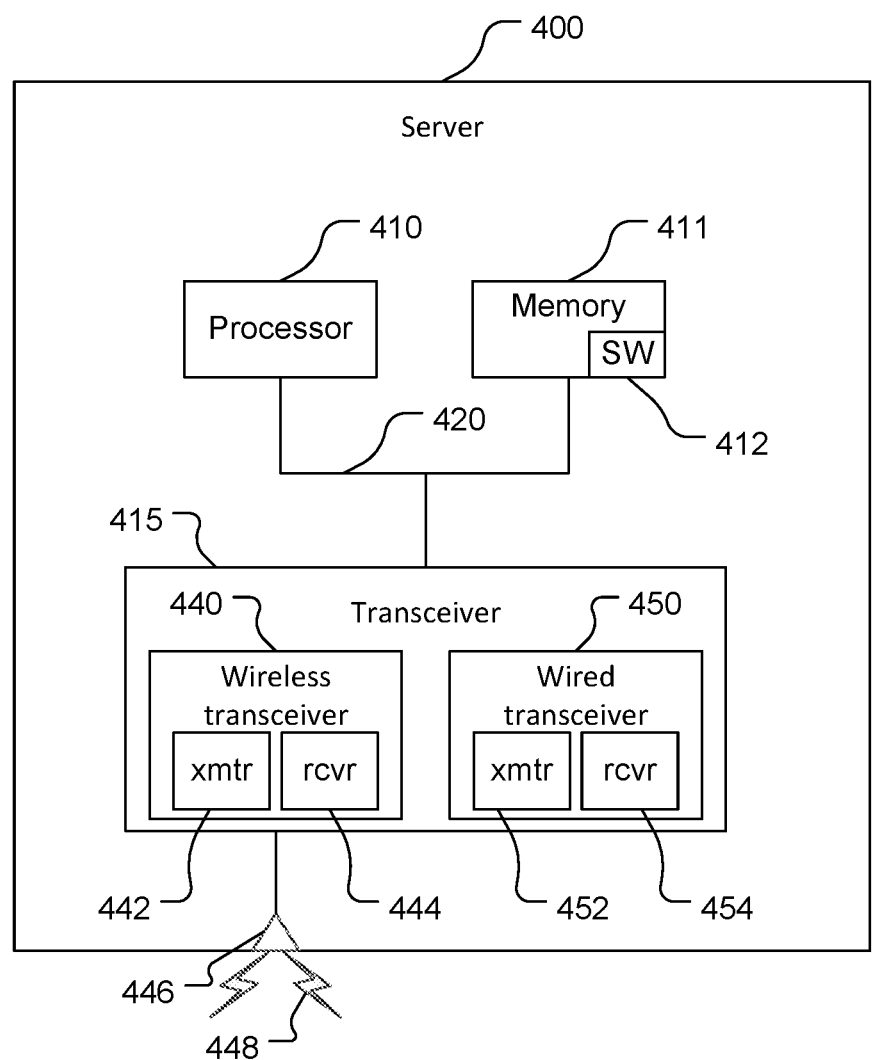
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb-size.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more)

consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Downlink PRS

The TRP 300 may provide PRS signals in PRS groups with various PRS characteristics. The PRS characteristics of PRS groups may comprise various combinations of quantities of PRS symbols, PRS resources, PRS resource sets, and/or frequency layers. PRS groups may be repeated (e.g., have multiple repetitions). The PRS characteristics (e.g., quantity of PRS resources, quantity of PRS symbols, quantity of PRS resource sets, quantity of frequency layers) are indicative of amounts of processing effort to process PRS groups, even though possibly not definitive of the processing effort. For example, the processing effort to process different PRS groups with the same characteristic value, e.g., the same quantity of resources, may be different. One or more PRS signals may be referred to herein as PRS.

Figure 5:
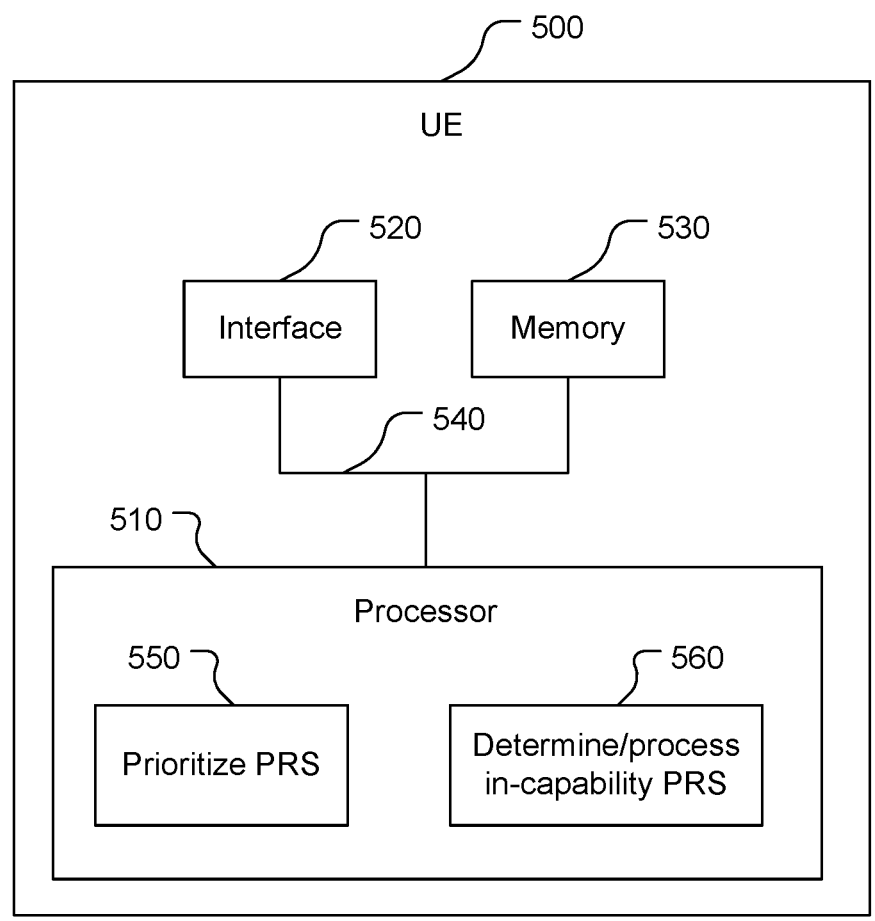
FIG. 5 is a block diagram of an example user equipment.

Referring to FIG. 5, with further reference to FIGS. 1 and 2, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a prioritize PRS functional unit 550 and a determine/process in-capability PRS functional unit 560 configured to, respectively, prioritize PRS, and to determine PRS within a processing capability of the processor 510 (in-capability PRS) and process the in-capability (e.g., in-budget, in-capacity) PRS to determining position information (e.g., one or more PRS measurements, or a position (location) of the UE 500). These functions are discussed further below, and the description may refer to the processor 510 generally, or the UE 500 generally, as performing any of these functions. The functional unit 550 and/or the functional unit 560 may be implemented in hardware, such as the processor 510, or elsewhere in the UE 500, such as in the memory 530 (e.g., in software), or a combination thereof.

The processor 510, e.g., the prioritize PRS functional unit 550, may be configured to prioritize incoming PRS (e.g., groups of PRS called PRS groups) for processing in accordance with at least one priority criterion, e.g., two or more priority criteria. For example, the functional unit 550 may be configured to give higher priority to PRS that arrive later than to PRS that arrive earlier, e.g., that correspond to a similar (e.g., identical) request for position information, e.g., the same measurement (e.g., RSRP (Reference Signal Receive Power), RSTD, ToA (Time of Arrival)) for the same TRP 300. As another example, the functional unit 550 may be configured to give higher priority to a request (e.g., trigger) for position information that arrives later than a request that arrived earlier, e.g., a later request for position information such as a range to a TRP 300. A request may be explicit (e.g., an instruction to process PRS and return an RSRP measurement and/or a position) or implicit, e.g., the provision of a PRS group (e.g., a collection of PRS resources and symbols) with the request for one or more measurements and/or a position of the UE 500 implied. As another example, the functional unit 550 may be configured to give higher priority to PRS that will result in, or correspond to a request for, a position indication for the UE 500 rather than a PRS measurement (e.g., RSRP, ToA). As another example, the functional unit 550 may be configured to give higher priority to PRS corresponding to an on-demand or aperiodic request for position information. The functional unit 550 may be configured to determine priority based on a combination of priority criteria. For example, priority criteria may have a hierarchy of priority, e.g., with an on-demand request having highest priority, and whether a request or trigger is for a position vs. a measurement having a next-highest priority. For example, for two requests/triggers arriving/happening at the same time, one for a position and one for a measurement, the request/trigger for the position may be given higher priority such that processing the corresponding PRS will take precedence over processing the corresponding PRS for the measurement. Having higher priority may not mean that the higher-priority PRS will be processed before lower-priority PRS, but if the processor 510 cannot process two PRS groups, then the processor 510 will process the PRS group of higher priority, if possible, and not process (or at least not process all of) the lower-priority PRS group. The functional unit 550 may or may not determine priority of PRS groups if a PRS processing capability of the processor 510 is not exceeded by a combination of the PRS groups.

The processor 510 may have a PRS processing capability, e.g., a capacity of the processor 510 for processing PRS. The capability may correspond to one or more quantities of one or more PRS characteristics that the processor 510 is able to, e.g., configured to, process. The capability may correspond to one or more quantities of one or more PRS characteristics that the processor 510 is configured to process at a particular time, or during a time window. The capability of the processor to process PRS may be dynamic and thus vary over time. For example, the PRS processing capability of the processor 510 may depend on an amount of total processing capability of the processor (i.e., for processing PRS and for non-PRS processing) that is presently used, or is expected to be used, for non-PRS processing (i.e., for any action other than processing PRS, e.g., processing non-PRS information such as a CSI-RS (Channel State Information—Reference Signal)). For example, the processor 510 may have more PRS processing capability during a measurement gap (where data and control information will not be received by the UE 500) than outside of a measurement gap. The processor 510 may calculate the PRS processing capability, e.g., based on the usage of the processor 510 for non-PRS-processing tasks, or may select one or more processing capability indications from stored values (e.g., for measurement gap, for outside measurement gap, etc.). Thus, while the PRS processing capability may be dynamic, the PRS processing capability may be selected from multiple static capabilities corresponding to various situations, or may be calculated on an ad hoc basis. The processor 510 may provide multiple indications of PRS processing capability with one or more corresponding conditions, e.g., for a measurement gap, outside a measurement gap, etc. Also or alternatively, the processor 510 may provide one or more indications of PRS processing capability of the processor 510 dynamically, as the PRS processing capability changes. Thus, a condition that the processor 510 may provide with a PRS processing capability indication may be a time window from a reference time, such as a present time, for which the PRS processing capability is applicable.

The processor 510 may provide indications of the PRS processing capability of the processor 510 in terms of positioning processing units (PPU). For example, the processor 510 may send, via the interface 520 (e.g., via the wireless transmitter 242 and the antenna 248) to a network entity (e.g., one or more TRPs 300, the server 400, etc.), indications of number of PRS resources and/or PRS symbols (and/or PRS resource sets and/or frequency layers) that the processor 510 can process (i.e., the PPU may include a number PRS resources and/or a number of PRS symbols). The indications may include a time window for receiving and/or processing the corresponding PRS resources and/or the corresponding PRS symbols. The time window may be static, e.g., corresponding to maximum number of resources and/or symbols that could be received in a fixed number of slots (e.g., agreed upon, programmed into the memory 530, etc.), or dynamic, e.g., corresponding to maximum number of resources and/or symbols in any length of time specified. The measurement window could be defined in time (e.g., milliseconds) or signal units corresponding to time (e.g., symbols). For example, the processor 510 may specify a maximum number of DL PRS resources (N1) that the processor 510 may measure across all TRPs 300 and frequency layers within a measurement window (T1), and report (e.g., to one or more network entities) the resource limit and time window as a tuple {N1, T1}. As another example, the processor 510 may specify a maximum number of symbols (N2) containing DL PRS resources of a maximum bandwidth that the processor 510 is configured to measure within a measurement window (T2), and report (e.g., to one or more network entities) the symbol limit and time window as a tuple {N2, T2}.

The processor 510, and in particular the determine/process in-capability PRS functional unit 560, is configured to determine which incoming PRS to process and to process such signals to determine position information. The functional unit 560 is configured to compare the PRS requested to be processed against the PRS processing capability of the processor 510. For example, the functional unit 560 can compare the characteristics of PRS requested to be processed (e.g., a combination of the PRS characteristics of PRS groups requested to be processed) against the (present) PRS characteristic limit(s) of the PRS processing capability of the processor 510. The functional unit 560 can process all received PRS if a combination of the PRS is within the PRS processing capability (e.g., a capacity for processing PRS) of the processor 510. For example, the functional unit 560 can determine measurements (e.g., RSRP, RSTD, ToA, etc.) of the PRS as appropriate (e.g., as requested and/or depending upon a positioning technique being used) and/or determine position of the UE 500 as appropriate (e.g., if requested).

The functional unit 560 may be configured to determine, in response to received/requested PRS exceeding the PRS processing capability of the processer 510, which PRS to process in accordance with the priority of the PRS and to process only the highest-priority PRS that, in combination, are within the PRS processing capability of the processor 510. The functional unit 560 may be configured (statically or dynamically) to implement one of at least two options for determining and selecting PRS to process. With a first option, the functional unit 560 may be configured to select, for processing, all of the highest-priority PRS groups that in combination are within the PRS processing capability of the processor 510 and not to process any portion of a lower-priority PRS group that would, when combined with the selected highest-priority PRS groups, exceed the PRS processing capability of the processor 510. That is, the functional unit 560 would not process any of the PRS group that has a next-highest-priority relative to the maximum quantity of highest-priority PRS groups that in combination are entirely within the PRS processing capability of the processor 510, or any other PRS group of lower priority than the next-highest-priority PRS group. With a second option, the functional unit 560 may be configured to select, for processing, all of the highest-priority PRS groups that in combination are entirely within the PRS processing capability of the processor 510 and, if there is still PRS processing capability available, further select a portion of the next-highest-priority PRS group to fill the PRS processing capability of the processor 510. The portion of the next-highest-priority PRS group may be, for example, a number of resources, or a number of resource sets, or a number of symbols, or a number of frequency layers depending upon which aspect of the PRS processing capability of the processor 510 that the next-highest-priority PRS group, if processed in full, would cause to be exceeded.

The functional unit 560 may be configured to replace processing of one PRS group with another PRS group. For example, a newly-received PRS group may cause the combination of the PRS groups to exceed the PRS processing capability of the processor 510 and may have a higher priority than one or more in-process PRS groups. In this case, the processor 510 may determine or re-determine the priority of the PRS groups, including the newly-received PRS group, and determine that an identified in-process PRS group would be the cause of the combination of the PRS groups being over the PRS processing capability of the processor 510 in accordance with the determined priority. Thus, the functional unit 560 may discontinue processing of the identified in-process PRS group (to allow processing of the newly-received PRS group) and may discard any processing results already determined from processing the identified in-process PRS group.

Operation

Figure 6:
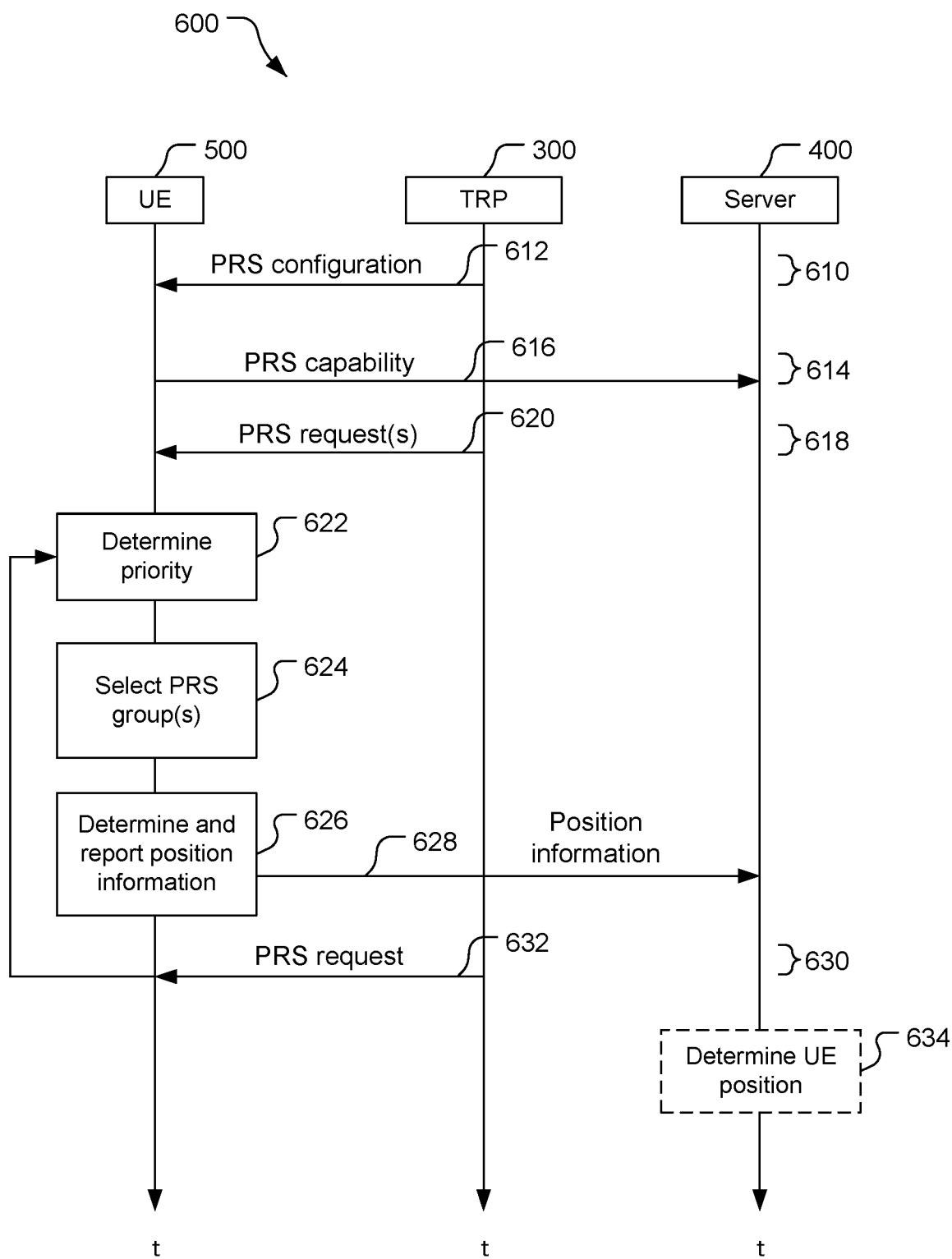
FIG. 6 is a signaling and process flow of processing positioning signals.

Referring also to FIG. 6, a signaling and process flow 600 of processing positioning signals includes the stages shown. The flow 600 is, however, an example only and not limiting. The flow 600 may be altered, e.g., by having stages added, removed, rearranged, combined, performed concurrently, and/or having single stages split into multiple stages. Further, as discussed below, stages may be repeated and may occur more often than shown and/or at different times than shown.

At stage 610, the TRP 300 provides a PRS configuration message 612 to the UE 500. The PRS configuration message 612 provides scheduling information for PRS including PRS groups. Thus, at least some of the PRS (e.g., PRS groups) sent to the UE 500 may be scheduled. The server 400 (e.g., an LMF) may provide the PRS configuration to the TRP 300.

At stage 614, the UE 500 sends a PRS capability message 616, with one or more indications of PRS processing capability of the processor 510, to the server 400. For example, the processor 510 may send, via the interface 520, indications of the maximum number of PRS resources N1 that the processor 510 is configured to process and possibly a corresponding time window T1 for the maximum number of PRS resources N1. The time window T1 may be a time during which the PRS resources are received or a time during which the PRS resources are to be processed. As another example, the processor 510 may send, via the interface 520, indications of the maximum number of PRS symbols N2 that the processor 510 is configured to process and possibly a corresponding time window T2 for the maximum number of PRS symbols N2. The time window T2 may be a time during which the PRS resources are received or a time during which the PRS symbols are to be processed. For example, in a scenario depicted in FIGS. 7A-7C, the UE 500 sends the server 400 indications that the processor 510 has a PRS processing capability of 38 PRS resources every 10 slots, i.e., N1=38 and T1=10 slots, and 44 symbols every 10 slots, i.e., N2=44 symbols and T2=10 slots. As another example, in a scenario depicted in FIGS. 8A-8C, the UE 500 sends the server 400 indications that the processor 510 has a PRS processing capability of 40 PRS resources every 10 slots, i.e., N1=40 and T1=10 slots, and 40 symbols every 10 slots, i.e., N2=40 symbols and T2=10 slots. Also or alternatively, other processing capability indications may be used, e.g., a maximum number of PRS resource sets that the processor 510 may process, and/or a maximum number of frequency layers for which the processor 510 may process PRS. The examples shown in FIGS. 7 and 8 have processing capability indications of PRS resources and PRS symbols, but these are examples only and not limiting of the disclosure. For example, the processor 510 may also or alternatively send indications of limits of PRS resource sets and/or frequency layers.

At stage 618, the TRP 300 sends one or more PRS requests 620 to the UE 500. The request(s) 620 may include one or more explicit requests and/or one or more implicit requests for the UE 500 to provide position information (e.g., one or more PRS measurements (e.g., for UE-assisted positioning) and/or a position of the UE 500 (for UE-based positioning)) based on PRS. The PRS request(s) 620 thus serve as one or more triggers for corresponding position information. The PRS request(s) 620 may include different PRS groups that may have the same or different PRS characteristics indicative of amounts of processing capability for processing of the PRS group(s). In the examples shown in FIGS. 7 and 8, in particular in FIGS. 7A and 8A, the PRS requests 620 include a first PRS group 710, 810 (PRS1), a second PRS group 720, 820 (PRS2), a third PRS group 730, 830 (PRS3), and a fourth PRS group 740, 840 (PRS4). The first PRS group 710, 810 is a first repetition of a PRS region including 12 symbols and 12 resources. The second PRS group 720, 820 is a second repetition of the same PRS region as the first PRS group 720, 810, and thus includes 12 symbols and 12 resources. The third PRS group 730, 830 is the sole repetition of a PRS region including 12 symbols and 12 resources. The fourth PRS group 740, 840 is the sole repetition of a PRS region including eight (8) symbols and four (4) resources.

At stage 622, the UE 500 determines a priority of the PRS groups. The processor 510, and in particular the prioritize PRS functional unit 550, may apply one or more priority criteria (e.g., time of arrival, whether a measurement or position is requested, etc.) to the PRS groups to determine an order of priority for the PRS groups. The processor 510 may be configured to process the PRS groups sequentially in order of priority, and/or the processor 510 may be configured to process one or more of the PRS groups concurrently (e.g., in parallel or interleaved) as long as the PRS processing capability of the processor 510 is not exceeded (at least by the PRS groups being processed). In the examples of FIGS. 7 and 8, through slot 3, the prioritize PRS functional unit 550 determines a priority order, in this case the third PRS group 730, 830, followed by the second PRS group 720, 820, followed by the first PRS group 710, 810. The flow 600 will proceed to stages 624 and 626, discussed further below, to process the received PRS if possible before new PRS is received. In these examples, the fourth PRS group 740, 840 is received before processing of any of the PRS groups 710, 720, 730, 810, 820, 830 completes, and thus the functional unit 550 determines a new priority order, in this case the third PRS group 730, 830, followed by the fourth PRS group 740, 840, followed by the second PRS group 720, 820, followed by the first PRS group 710, 810.

At stage 624, the UE 500 selects the PRS group(s) for processing by the processor 510. The processor 510, and in particular the determine/process in-capability PRS functional unit 560, selects a subset of the PRS groups that includes as many of the PRS groups as possible, in the order of priority determined at stage 622, while not violating the (present) PRS processing capability of the processor 510, i.e., the highest-priority PRS groups that in combination do not exceed the PRS processing capability of the processor 510. The functional unit 560 determines whether the PRS characteristics of the PRS received in the PRS request(s) 620 (and/or 632 discussed below) would violate the PRS processing capability of the processor 510, assuming all OFDM symbols occupied by a PRS resource are accounted for in the computation of the processing load. If the PRS processing capability would be exceeded, then the processor 510 is not expected to process at least an amount of the PRS exceeding the PRS processing capability (or report position information that would result from processing such PRS), but may report position information from PRS that are processed. In the examples shown in FIGS. 7B and 8B, because the addition of the fourth PRS group would violate the resource limit of 38 resources or the symbol limit of 44 symbols, respectively, the functional unit 550 selects PRS groups in order of priority until the resource or symbol limit will be violated.

In the example of FIG. 7B, the functional unit 550 selects the third, fourth, and second PRS groups 730, 740, 720 for processing because the combination of these groups comprises 28 resources and 32 symbols, which are below the limits of 38 resources and 44 symbols, while the addition of the first PRS group (which is the next-highest priority PRS group to the groups that are within the PRS processing capability of the processor 510) would violate the resource limit of the processor 510. In the example of FIG. 7B, the functional unit 550 is configured not to select any portion of the PRS group that, given the priority order of the groups, would put the combination of PRS groups over the PRS processing capability of the processor 510, here the first PRS group 710, or any other PRS group of lower priority than the PRS group that would put the combination of PRS groups over the PRS processing capability of the processor 510.

In the example of FIG. 7C, the functional unit 550 is configured to select, in addition to the subset of the largest group of the highest-priority PRS groups that combined, in their entireties, do not violate the PRS processing capability of the processor, a portion of the next-highest priority PRS group up to the resource processing capability of the processor 510. In the example of FIG. 7C, as the combination of the PRS groups 730, 740, 720 has 28 resources and is thus 10 resources shy of the PRS resource capability of the processor 510, the functional unit 550 selects a portion 750 comprising 10 resources of the PRS group 710 for processing and another portion 760 comprising the other two resources of the PRS group 710 is left out of the PRS selected for processing.

The examples shown in FIGS. 8B and 8C are similar to the examples shown in FIGS. 7B and 7C, except that in the example of FIG. 8, the PRS symbol processing capability of the processor 510 would be violated. Hence, in the example of FIG. 8B, the functional unit 550 is configured not to select any portion of the PRS group that would put the combination of PRS groups over the PRS processing capability of the processor 510, here the first PRS group 810, or any other PRS group of lower priority than the PRS group that would put the combination of PRS groups over the PRS processing capability of the processor 510. In the example of FIG. 8C, the functional unit 550 is configured to select, in addition to the subset of the largest group of the highest-priority PRS groups that combined, in their entireties, do not violate the PRS processing capability of the processor, a portion of the next-highest priority PRS group up to the symbol processing capability of the processor 510. In the example of FIG. 8C, as the combination of the PRS groups 830, 840, 820 has 32 symbols and is thus eight resources shy of the PRS symbol capability of the processor 510, the functional unit 550 selects a portion 850 comprising eight symbols of the PRS group 810 for processing and another portion 860 comprising the other four symbols of the PRS group 810 is left out of the PRS selected for processing.

At stage 626, the UE 500 processes the selected PRS to determine position information 628 and reports the determined position information 628 to one or more network entities such as the server 400 (and/or the TRP 300, although not shown in FIG. 6). The processor 510, and in particular the determine/process in-capability PRS functional unit 560, processes the PRS of the selected PRS groups, including any partially-selected PRS group, to determine position information such as one or more signal measurements and/or a location of the UE 500 and provides this information to the network entity(ies). Partial PRS groups may yield valuable information for positioning, e.g., an RSRP value. Thus, processing partial PRS groups may be beneficial and may be performed.

At stage 630, another PRS request 632 is received by the UE 500. The PRS request 632 may be received at any of various times during the flow 600. As indicated, the flow 600 returns to stage 622 in response to receipt of a further PRS request 632 at stage 630. For example, a PRS request may be received after the stage 624 and during the stage 626, causing the processor 510 to re-determine a priority at stage 622 and re-select PRS group(s) at stage 624, examples of which were discussed above.

At stage 634, the server 400 may determine a position of the UE 500. For example, if UE-assisted positioning is implemented by the UE 500 and the server 400, the server 400 may use one or more PRS measurements provided by the UE 500 in the position information 628 to determine the location of the UE 500, e.g., by trilateration.

Figure 9:
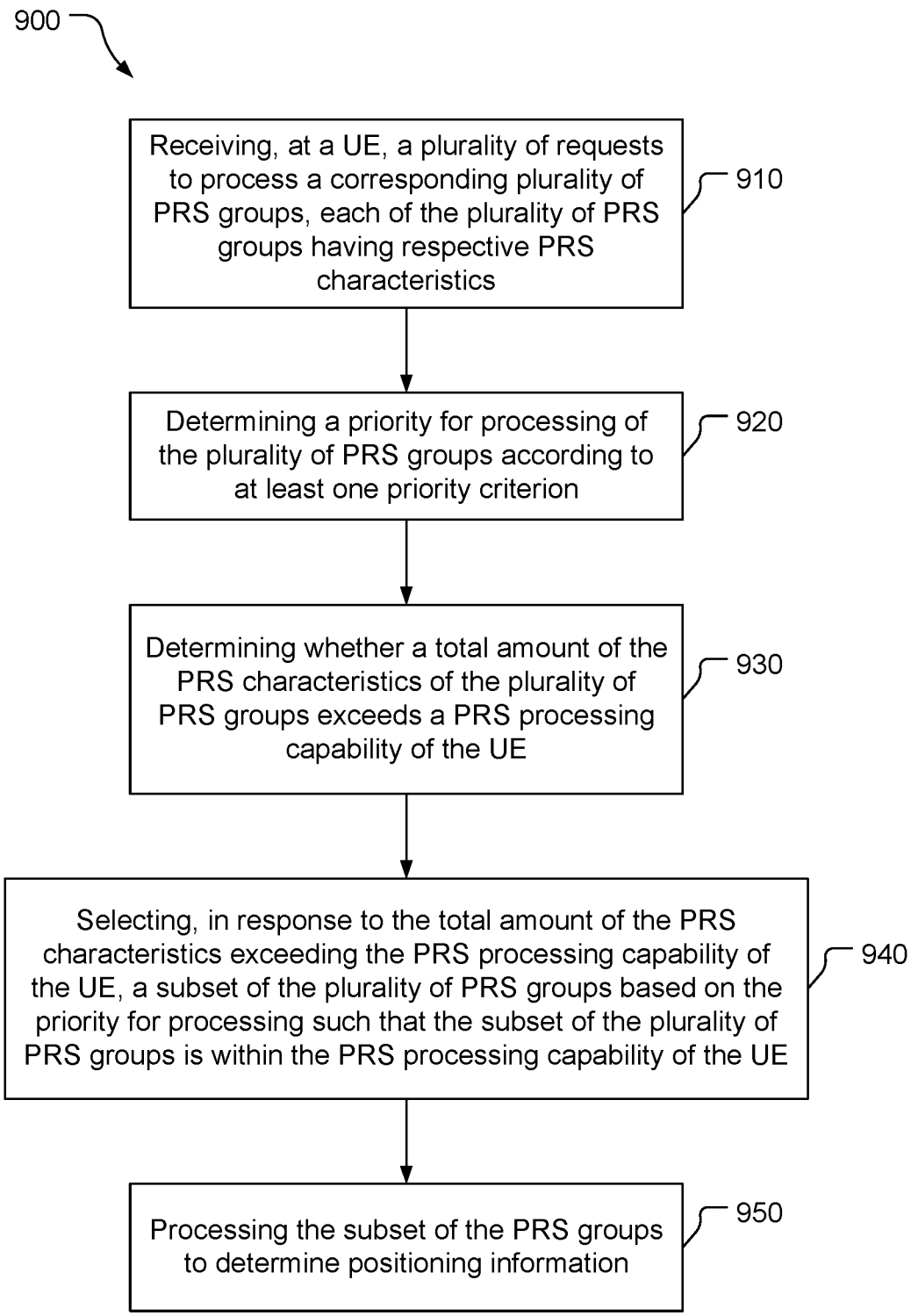
FIG. 9 is a block flow diagram of a method of processing positioning reference signals.

Referring to FIG. 9, with further reference to FIGS. 1-8, a method 900 of processing positioning reference signals includes the stages shown. The method 900 is, however, an example only and not limiting. The method 900 may be altered, e.g., by having stages added, removed, rearranged, combined, performed concurrently, and/or having single stages split into multiple stages.

At stage 910, the method 900 may include receiving, at a user equipment (UE), a plurality of requests to process a corresponding plurality of PRS groups, each of the plurality of PRS groups having respective PRS characteristics. For example, the UE 500 may receive PRS requests 620, 632 including PRS groups, e.g., the PRS groups 710, 720, 730, 740, 810, 820, 830, 840. Each PRS group may be an implicit request for position information. The processor 510 and the interface 520 may comprise means for receiving requests to process PRS groups. Means for receiving requests to process PRS groups may comprise at least a portions of the transceiver 215, e.g., the wireless receiver 244, the antenna 246, the processor 210 (e.g., the general-purpose processor 230 and/or the DSP 231), and the memory 211.

At stage 920, the method 900 may include determining a priority for processing of the plurality of PRS groups according to at least one priority criterion. For example, the processor 510 may prioritize processing of the PRS groups. As discussed with respect to stage 622, the processor 510 may analyze when the request(s) was(were) received (e.g., times of arrival of multiple PRS groups), what information the request(s) seek (e.g., measurement or location), whether the request was scheduled or ad hoc, etc. to assign an order to the PRS groups for priority of processing of the PRS groups (though not necessarily a sequence for processing the PRS groups). This prioritized ordering may help improve latency by helping to ensure that more-important processing (e.g., determining and/or providing a location of the UE 500) is performed before and/or in lieu of less-important processing (e.g., measuring PRS). The processor 510 and the memory 530 (e.g., the general-purpose processor 230 and/or the DSP 231 and the memory 211) may comprise means for determining a priority for processing of the PRS groups.

At stage 930, the method 900 may include determining whether a total amount of the PRS characteristics of the plurality of PRS groups exceeds a PRS processing capability of the UE. As discussed above with respect to stage 624, the processor 510 may determine that the combined PRS characteristics (e.g., a number of resources, and/or a number of resource sets, and/or a number of symbols, and/or a number of frequency layers) in the PRS groups exceeds one or more corresponding indications of PRS processing capability of the UE 500. The processor 510 and the memory 530 (e.g., the general-purpose processor 230 and/or the DSP 231 and the memory 211) may comprise means for determining whether a total amount of PRS characteristics of the plurality of PRS groups exceeds a PRS processing capability of the UE.

At stage 940, the method 900 may include selecting, in response to the total amount of the PRS characteristics of the plurality of PRS groups exceeding the PRS processing capability of the UE, a subset of the plurality of PRS groups based on the priority for processing such that the subset of the plurality of PRS groups is within the PRS processing capability of the UE. For example, as discussed above with respect to stage 624, the processor 510 may select the highest-priority PRS groups that in combination have PRS characteristics (e.g., resources, resource sets, symbols, and/or frequency layers of the PRS groups) that are within a PRS processing budget of the processor 510 for processing PRS.

Thus, the subset of PRS groups may comprise sets of PRS symbols, or sets of PRS resources, or sets of PRS resource sets, or sets of frequency layers (or combinations thereof). The PRS processing budget may vary over time and thus the processor 510 may determine the subset such that the combined PRS characteristics of the subset are within a present processing budget of the processor 510 for processing PRS. The subset may include only whole PRS groups (e.g., as shown in, and discussed with respect to, FIGS. 7B and 8B) and thus exclude any portion of any of the PRS groups having a lower priority than a lowest-priority PRS group of the highest-priority whole PRS groups that in combination are within the PRS processing capability of the UE 500. Alternatively, the subset may include at least one partial PRS group (e.g., as shown in, and discussed with respect to, FIGS. 7C and 8C). Where a partial PRS group is permitted, the processor 510 may, for example, include in the subset a portion of the next-highest-priority PRS group (relative to the highest-priority whole PRS groups that are within the PRS processing capability of the processor 510) that includes PRS characteristics (e.g., resources, symbols, resource sets, frequency layers) equal to a difference between the combined total of the PRS characteristics of the highest-priority whole PRS groups in the subset and the PRS processing capability of the UE 500. The processing capability may be, for example, a PRS symbol processing capability, a PRS resource processing capability, a PRS resource set processing capability, or a frequency layer processing capability, each of which comprises a limit on a quantity of the PRS resources, PRS symbols, PRS resource sets, or frequency layers, respectively, that the UE 500 is configured to process. The processor 510 and the memory 530 (e.g., the general-purpose processor 230 and/or the DSP 231 and the memory 211) may comprise means for selecting the subset of the plurality of PRS groups.

At stage 950, the method 900 may include processing the subset of the plurality of PRS groups to determine position information. For example, as discussed with respect to stage 626, the processor 510 may determine position information such as one or more PRS measurements or the location of the UE 500. The processor 510 and the memory 530 (e.g., the general-purpose processor 230 and/or the DSP 231 and the memory 211) may comprise means for processing the subset of the plurality of PRS groups.

The method 900 may include one or more further features, including one or more of the following features. For example, the method 900 may include sending an indication of the PRS processing capability of the UE for processing PRS to a network entity. For example, as discussed with respect to stage 614, the processor 510 may send indications of maximum numbers of PRS resources or PRS symbols (or PRS resource sets, or frequency layers) that the processor 510 is configured to process. The capability may include indications of times frames corresponding to these processing limits, and the processor 510 may send multiple indications of processing capability that may include static (e.g., corresponding to different known situations such as during a memory gap) and/or dynamic capability indications, e.g., ad hoc as usage of the processor 510 changes. The capability indication may include a tuple of maximum PRS resources and a time window, a tuple of maximum PRS symbols and a time window, or a combination of these, and multiple such tuples may be sent. Means for sending the indication of the PRS processing capability may include the processor 510 and the interface 520, e.g., may include the general-purpose processor 230 and/or the DSP 231, the memory 211, the wireless transmitter 242, and the antenna 248. The method 900 may include determining the indication of the PRS processing capability of the UE based on non-PRS processing capability of the UE for processing information other than PRS. For example, the processor 510 may determine the PRS processing capability based on usage of the processor 510 for one or more non-PRS-processing tasks that is(are) planned and/or is(are) presently being performed.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
   an interface;
   a memory; and
   a processor, communicatively coupled to the interface and the memory, configured to:
     receive a plurality of requests to process a corresponding plurality of positioning reference signal (PRS) groups, each of the plurality of PRS groups having respective PRS characteristics;
     determine a priority for processing the plurality of PRS groups according to at least one priority criterion;
     determine whether a total amount of the PRS characteristics of the plurality of PRS groups exceeds a PRS processing capability of the processor; and
     select, in response to the total amount of the PRS characteristics of the plurality of PRS groups exceeding the PRS processing capability of the processor, a subset of the plurality of PRS groups based on the priority for processing; and
     process the subset of the plurality of PRS groups to determine position information.

2. The UE of claim 1, wherein the processor is configured to select the subset of the plurality of PRS groups such that the subset of the plurality of PRS groups is within the PRS processing capability of the processor.

3. The UE of claim 1, wherein each of the plurality of PRS groups comprises a plurality of PRS symbols, or a plurality of PRS resources, or a plurality of PRS resource sets, or a plurality of frequency layers.

4. The UE of claim 1, wherein to select the subset of the plurality of PRS groups the processor is configured to select a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the processor, and to exclude any portion of any of the plurality of PRS groups having a lower priority than a lowest-priority PRS group of the first subset of the plurality of PRS groups.

5. The UE of claim 1, wherein to select the subset of the plurality of PRS groups the processor is configured to select a second subset of the plurality of PRS groups that includes a maximum number of highest-priority PRS groups of the plurality of PRS groups, based on the priority for processing, with a second subset total quantity of the PRS characteristics of the second subset of the plurality of PRS groups being equal to or less than the PRS processing capability of the processor, and to select a portion of a next-highest priority PRS group, relative to the second subset, of the plurality of PRS groups that is equal to a difference between the second subset total quantity of the PRS characteristics and the PRS processing capability of the processor.

6. The UE of claim 5, wherein each of the plurality of PRS groups comprises a plurality of PRS symbols, and wherein the processor is configured to select as the portion of the next-highest priority PRS group of the plurality of PRS groups a quantity of symbols, of the next-highest priority PRS group of the plurality of PRS groups, that is equal to a difference between a total quantity of PRS symbols of the second subset of the plurality of PRS groups and a PRS symbol processing capability of the processor.

7. The UE of claim 5, wherein each the plurality of PRS groups comprises a plurality of PRS resources, and wherein the processor is configured to select as the portion of the next-highest priority PRS group of the plurality of PRS groups a quantity of PRS resources, of the next-highest priority PRS group of the plurality of PRS groups, that is equal to a difference between a total quantity of PRS resources of the second subset of the plurality of PRS groups and a PRS resource processing capability of the processor.

8. The UE of claim 1, further comprising a transmitter communicatively coupled to the processor, wherein the processor is configured to send, via the transmitter, an indication of the PRS processing capability of the processor to a network entity.

9. The UE of claim 8, wherein the processor is configured to send, as the indication of the PRS processing capability of the processor, a quantity of PRS resources, or a quantity of PRS symbols, or a quantity of PRS resource sets, or a quantity of frequency layers.

10. The UE of claim 9, wherein the processor is configured to send, as the indication of the PRS processing capability of the processor:
at least one first tuple comprising the quantity of PRS resources and a first time window; or
at least one second tuple comprising the quantity of PRS symbols and a second time window; or
a combination of these.

11. The UE of claim 8, wherein the processor is configured to determine the indication of the PRS processing capability of the processor based on non-PRS processing capability of the processor for processing information other than PRS.

12. The UE of claim 1, wherein the at least one priority criterion comprises whether the position information is a location of the UE or a positioning signal measurement, or a time of arrival of each of at least two of the plurality of PRS groups, or whether each of the plurality of requests was a scheduled request.

13. A user equipment (UE) comprising:
means for receiving a plurality of requests to process a corresponding plurality of positioning reference signal (PRS) groups, each of the plurality of PRS groups having respective PRS characteristics;
means for determining a priority for processing of the plurality of PRS groups according to at least one priority criterion;
means for determining whether a total amount of the PRS characteristics of the plurality of PRS groups exceeds a PRS processing capability of the UE;
selecting means for selecting, in response to the total amount of the PRS characteristics of the plurality of PRS groups exceeding the PRS processing capability of the UE, a subset of the plurality of PRS groups based on the priority for processing; and
means for processing the subset of the plurality of PRS groups to determine position information.

14. The UE of claim 13, wherein the selecting means comprise means for selecting the subset of the plurality of PRS groups such that the subset of the plurality of PRS groups is within the PRS processing capability of the UE.

15. The UE of claim 13, wherein each of the plurality of PRS groups comprises a plurality of PRS symbols, or a plurality of PRS resources, or a plurality of PRS resource sets, or a plurality of frequency layers.

16. The UE of claim 13, wherein to select the subset of the plurality of PRS groups the selecting means comprise means for selecting a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the UE, and to exclude any portion of any of the plurality of PRS groups having a lower priority than a lowest-priority PRS group of the first subset of the plurality of PRS groups.

17. The UE of claim 13, wherein to select the subset of the plurality of PRS groups the selecting means comprise means for selecting a second subset of the plurality of PRS groups that includes a maximum number of highest-priority PRS groups of the plurality of PRS groups, based on the priority for processing, with a second subset total quantity of the PRS characteristics of the second subset of the plurality of PRS groups being equal to or less than the PRS processing capability of the UE, and for selecting a portion of a next-highest priority PRS group, relative to the second subset, of the plurality of PRS groups that is equal to a difference between the second subset total quantity of the PRS characteristics and the PRS processing capability of the UE.

18. The UE of claim 17, wherein each of the plurality of PRS groups comprises a plurality of PRS symbols, and wherein to select as the portion of the next-highest priority PRS group of the plurality of PRS groups the selecting means comprise means for selecting a quantity of symbols, of the next-highest priority PRS group of the plurality of PRS groups, that is equal to a difference between a total quantity of PRS symbols of the second subset of the plurality of PRS groups and a PRS symbol processing capability of the UE.

19. The UE of claim 17, wherein each of the plurality of PRS groups comprises a plurality of PRS resources, and wherein to select as the portion of the next-highest priority PRS group of the plurality of PRS groups the selecting means comprise means for selecting a quantity of PRS resources, of the next-highest priority PRS group of the plurality of PRS groups, that is equal to a difference between a total quantity of PRS resources of the second subset of the plurality of PRS groups and a PRS resource processing capability of the UE.

20. The UE of claim 13, further comprising sending means for sending an indication of the PRS processing capability of the UE to a network entity.

21. The UE of claim 20, wherein the sending means comprise means for sending, as the indication of the PRS processing capability of the UE, a quantity of PRS resources, or a quantity of PRS symbols, or a quantity of PRS resource sets, or a quantity of frequency layers.

22. The UE of claim 21, wherein the sending means comprise means for sending, as the indication of the PRS processing capability of the UE:
at least one first tuple comprising the quantity of PRS resources and a first time window; or
at least one second tuple comprising the quantity of PRS symbols and a second time window; or
a combination of these.

23. The UE of claim 20, further comprising means for determining the indication of the PRS processing capability of the UE based on non-PRS processing capability of the UE for processing information other than PRS.

24. The UE of claim 13, wherein the at least one priority criterion comprises whether the position information is a location of the UE or a positioning signal measurement, or a time of arrival of each of at least two of the plurality of PRS groups, or whether each of the plurality of requests was a scheduled request.

25. A method of processing positioning reference signals, the method comprising:
receiving, at a user equipment (UE), a plurality of requests to process a corresponding plurality of positioning reference signal (PRS) groups, each of the plurality of PRS groups having respective PRS characteristics;
determining a priority for processing of the plurality of PRS groups according to at least one priority criterion;
determining whether a total amount of the PRS characteristics of the plurality of PRS groups exceeds a PRS processing capability of the UE;
selecting, in response to the total amount of the PRS characteristics of the plurality of PRS groups exceeding the PRS processing capability of the UE, a subset of the plurality of PRS groups based on the priority for processing; and
processing the subset of the plurality of PRS groups to determine position information.

26. The method of claim 25, wherein the subset of the plurality of PRS groups is selected such that the subset of the plurality of PRS groups is within the PRS processing capability of the UE.

27. The method of claim 25, wherein each of the plurality of PRS groups comprises a plurality of PRS symbols, or a plurality of PRS resources, or a plurality of PRS resource sets, or a plurality of frequency layers.

28. The method of claim 25, wherein selecting the subset of the plurality of PRS groups comprises selecting a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the UE, and excluding any portion of any of the plurality of PRS groups having a lower priority than a lowest-priority PRS group of the first subset of the plurality of PRS groups.

29. The method of claim 25, wherein selecting the subset of the plurality of PRS groups comprises selecting a second subset of the plurality of PRS groups that includes a maximum number of highest-priority PRS groups of the plurality of PRS groups, based on the priority for processing, with a second subset total quantity of the PRS characteristics of the second subset of the plurality of PRS groups being equal to or less than the PRS processing capability of the UE, and selecting a portion of a next-highest priority PRS group, relative to the second subset, of the plurality of PRS groups that is equal to a difference between the second subset total quantity of the PRS characteristics and the PRS processing capability of the UE.

30. The method of claim 29, wherein each of the plurality of PRS groups comprises a plurality of PRS symbols, and wherein selecting the portion of the next-highest priority PRS group of the plurality of PRS groups comprises selecting a quantity of symbols, of the next-highest priority PRS group of the plurality of PRS groups, that is equal to a difference between a total quantity of PRS symbols of the second subset of the plurality of PRS groups and a PRS symbol processing capability of the UE.

31. The method of claim 29, wherein each of the plurality of PRS groups comprises a plurality of PRS resources, and wherein selecting the portion of the next-highest priority PRS group of the plurality of PRS groups comprises selecting a quantity of PRS resources, of the next-highest priority PRS group of the plurality of PRS groups, that is equal to a difference between a total quantity of PRS resources of the second subset of the plurality of PRS groups and a PRS resource processing capability of the UE.

32. The method of claim 25, further comprising sending an indication of the PRS processing capability of the UE to a network entity.

33. The method of claim 32, wherein the indication of the PRS processing capability of the UE comprises a quantity of PRS resources, or a quantity of PRS symbols, or a quantity of PRS resource sets, or a quantity of frequency layers.

34. The method of claim 33, wherein the indication of the PRS processing capability of the UE comprises:
at least one first tuple comprising the quantity of PRS resources and a first time window; or
at least one second tuple comprising the quantity of PRS symbols and a second time window; or
a combination of these.

35. The method of claim 32, further comprising determining the indication of the PRS processing capability of the UE based on non-PRS processing capability of the UE for processing information other than PRS.

36. The method of claim 25, wherein the at least one priority criterion comprises whether the position information is a location of the UE or a positioning signal measurement, or a time of arrival of each of at least two of the plurality of PRS groups, or whether each of the plurality of requests was a scheduled request.

37. A non-transitory computer-readable storage medium comprising processor-readable instructions configured to cause a processor to:
receive a plurality of requests to process a corresponding plurality of positioning reference signal (PRS) groups, each of the plurality of PRS groups having respective PRS characteristics; determine a priority for processing of the plurality of PRS groups according to at least one priority criterion; determine whether a total amount of the PRS characteristics of the plurality of PRS groups exceeds a PRS processing capability of the processor; select, in response to the total amount of the PRS characteristics of the plurality of PRS groups exceeding the PRS processing capability of the processor, a subset of the plurality of PRS groups based on the priority for processing; and process the subset of the plurality of PRS groups to determine position information.

38. The non-transitory computer-readable storage medium of claim 37, wherein the instructions configured to cause the processor to select the subset of the plurality of PRS groups are configured to cause the processor to select the subset of the plurality of PRS groups such that the subset of the plurality of PRS groups is within the PRS processing capability of the processor.

39. The non-transitory computer-readable storage medium of claim 37, wherein each of the plurality of PRS groups comprises a plurality of PRS symbols, or a plurality of PRS resources, or a plurality of PRS resource sets, or a plurality of frequency layers.

40. The non-transitory computer-readable storage medium of claim 37, wherein to select the subset of the plurality of PRS groups the instructions are configured to cause the processor to select a first subset of the plurality of PRS groups that includes a maximum number of highest-priority PRS groups of the plurality of PRS groups, based on the priority for processing, with a first subset total quantity of the PRS characteristics of the first subset of the plurality of PRS groups being equal to or less than the PRS processing capability of the processor, and to exclude any portion of any of the plurality of PRS groups having a lower priority than a lowest-priority PRS group of the first subset of the plurality of PRS groups.

41. The non-transitory computer-readable storage medium of claim 37, wherein to select the subset of the plurality of PRS groups the instructions are configured to cause the processor to select a second subset of the plurality of PRS groups that includes a maximum number of highest-priority PRS groups of the plurality of PRS groups, based on the priority for processing, with a second subset total quantity of the PRS characteristics of the second subset of the plurality of PRS groups being equal to or less than the PRS processing capability of the processor, and to select a portion of a next-highest priority PRS group, relative to the second subset, of the plurality of PRS groups that is equal to a difference between the second subset total quantity of the PRS characteristics and the PRS processing capability of the processor.

42. The non-transitory computer-readable storage medium of claim 41, wherein each of the plurality of PRS groups comprises a plurality of PRS symbols, and wherein to select the portion of the next-highest priority PRS group of the plurality of PRS groups the instructions are configured to cause the processor to select a quantity of symbols, of the next-highest priority PRS group of the plurality of PRS groups, that is equal to a difference between a total quantity of PRS symbols of the second subset of the plurality of PRS groups and a PRS symbol processing capability of the processor.

43. The non-transitory computer-readable storage medium of claim 41, wherein each of the plurality of PRS groups comprises a plurality of PRS resources, and wherein to select the portion of the next-highest priority PRS group of the plurality of PRS groups the instructions are configured to cause the processor to select a quantity of PRS resources, of the next-highest priority PRS group of the plurality of PRS groups, that is equal to a difference between a total quantity of PRS resources of the second subset of the plurality of PRS groups and a PRS resource processing capability of the processor.

44. The non-transitory computer-readable storage medium of claim 37, wherein the instructions are configured to cause the processor to send an indication of the PRS processing capability of the processor to a network entity.

45. The non-transitory computer-readable storage medium of claim 44, wherein the indication of the PRS processing capability of the processor comprises a quantity of PRS resources, or a quantity of PRS symbols, or a quantity of PRS resource sets, or a quantity of frequency layers.

46. The non-transitory computer-readable storage medium of claim 45, wherein the indication of the PRS processing capability of the processor comprises: at least one first tuple comprising the quantity of PRS resources and a first time window; or at least one second tuple comprising the quantity of PRS symbols and a second time window; or a combination of these.

47. The non-transitory computer-readable storage medium of claim 44, wherein the instructions are configured to cause the processor to determine the indication of the PRS processing capability of the processor based on non-PRS processing capability of the processor for processing information other than PRS.

48. The non-transitory computer-readable storage medium of claim 37, wherein the at least one priority criterion comprises whether the position information is a location of the processor or a positioning signal measurement, or a time of arrival of each of at least two of the plurality of PRS groups, or whether each of the plurality of requests was a scheduled request.

* * * * *